United States Patent
You et al.

(10) Patent No.: US 10,292,091 B2
(45) Date of Patent: May 14, 2019

(54) METHOD AND TERMINAL FOR DETECTING DISCOVERY SIGNAL

(71) Applicant: LG ELECTRONICS INC., Seoul (KR)

(72) Inventors: Hyangsun You, Seoul (KR); Yunjung Yi, Seoul (KR); Jonghyun Park, Seoul (KR); Bonghoe Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/123,547

(22) PCT Filed: Apr. 14, 2015

(86) PCT No.: PCT/KR2015/003724
§ 371 (c)(1),
(2) Date: Sep. 2, 2016

(87) PCT Pub. No.: WO2015/160171
PCT Pub. Date: Oct. 22, 2015

(65) Prior Publication Data
US 2017/0078953 A1 Mar. 16, 2017

Related U.S. Application Data

(60) Provisional application No. 61/981,177, filed on Apr. 17, 2014, provisional application No. 62/036,630, filed on Aug. 13, 2014.

(51) Int. Cl.
*H04W 48/20* (2009.01)
*H04W 48/16* (2009.01)
(Continued)

(52) U.S. Cl.
CPC ......... *H04W 48/16* (2013.01); *H04J 11/0069* (2013.01); *H04L 5/0048* (2013.01);
(Continued)

(58) Field of Classification Search
CPC ... H04W 48/16; H04W 48/20; H04W 84/045; H04L 5/0048; H04J 11/00
See application file for complete search history.

(56) References Cited

U.S. PATENT DOCUMENTS

2013/0336214 A1 12/2013 Sayana et al.
2015/0092768 A1* 4/2015 Ng .................. H04W 48/16
370/350

FOREIGN PATENT DOCUMENTS

WO WO 2013/133608 A1 9/2013

OTHER PUBLICATIONS

Huawei et al., "Network assistance for small cell discovery", R1-141127, 3GPP TSG-RAN WG1 Meeting #76bis, Shenzhen, China, Mar. 31-Apr. 4, 2014, 3 pages.

(Continued)

*Primary Examiner* — Nam T Huynh
(74) *Attorney, Agent, or Firm* — Birch, Stewart, Kolasch & Birch, LLP

(57) ABSTRACT

A disclosure of the present specification provides a method for detecting a discovery signal. The method is a method for detecting discovery signals from a plurality of transmission points (TP) using the same physical cell identifier (PCID) and may comprise the steps of: determining scrambling identifiers of the discovery signals for the plurality of transmission points on the basis of the PCID which is commonly used by the plurality of transmission points and resource elements (REs) of the discovery signals transmitted from the plurality of transmission points; and demodulating the discovery signals on respective positions of the resource elements using the determined scrambling identifiers to detect the discovery signals.

8 Claims, 18 Drawing Sheets

(51) Int. Cl.
*H04J 11/00* (2006.01)
*H04L 5/00* (2006.01)
H04B 1/7073 (2011.01)
H04B 1/7083 (2011.01)
H04W 84/04 (2009.01)
H04L 27/26 (2006.01)

(52) U.S. Cl.
CPC ........... *H04L 5/0053* (2013.01); *H04W 48/20* (2013.01); *H04B 1/7083* (2013.01); *H04B 1/70735* (2013.01); *H04J 11/005* (2013.01); *H04L 27/2655* (2013.01); *H04W 84/045* (2013.01)

(56) References Cited

OTHER PUBLICATIONS

Mediatek Inc., "On enhancements for small cell discovery and RRM measurements", R1-141485, 3GPP TSG RAN-WG1 Meeting #76bis, Shenzhen, China, Mar. 31-Apr. 4, 2014, 6 pages.
NTT Docomo, "Views on network assistance for Rel. 12 discovery procedure", R1-141465, 3GPP TSG-RAN WG1 Meeting #76bis, Shenzhen, China, Mar. 31-Apr. 4, 2014, 4 pages.

* cited by examiner

FIG. 10
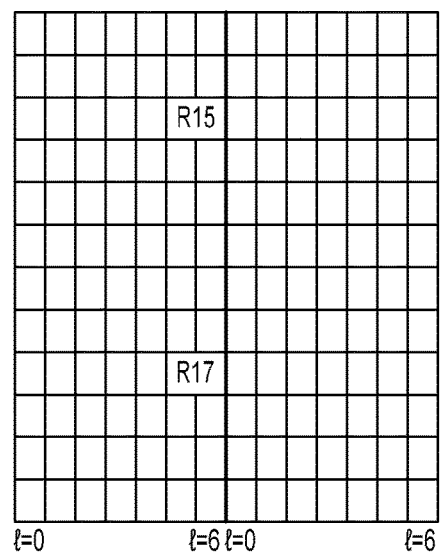
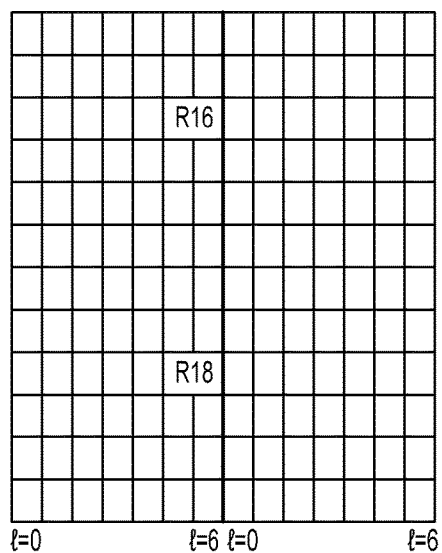
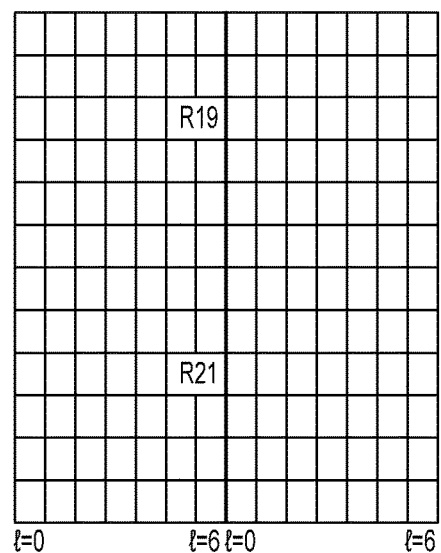
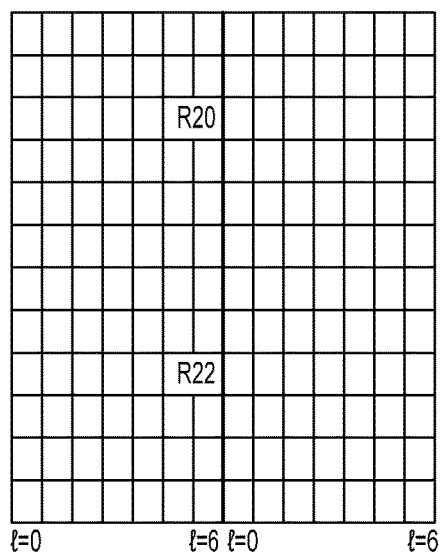

FIG. 15
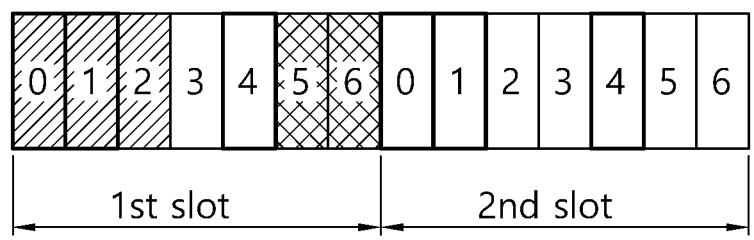
1st slot | 2nd slot
 : Symbol on which CRS is transmitted
 : Symbol on which PSS/SSS is transmitted
 : Symbol on which PDCCH is transmitted

METHOD AND TERMINAL FOR DETECTING DISCOVERY SIGNAL

CROSS REFERENCE TO RELATED APPLICATIONS

This application is the National Phase of PCT International Application No. PCT/KR2015/003724, filed on Apr. 14, 2015, which claims priority under 35 U.S.C. 119(e) to U.S. Provisional Application Nos. 61/981,177, filed on Apr. 17, 2014 and 62/036,630, filed on Aug. 13, 2014, all of which are hereby expressly incorporated by reference into the present application.

BACKGROUND OF THE INVENTION

Field of the Invention
The present invention relates to mobile communication.
Related Art
3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, an environment in which a plurality of small-scale cells (or small cells) are implemented or a plurality of small cells and macro cells are used together may be considered or implemented in recent years.

In this case, a small cell may be used as a primary cell (Pcell) of a specific user equipment (UE), and the small cell may be used only as a secondary cell (Scell).

In addition, recently, in order for the UE to be able to more effectively discover densely located small cells, it is considered to generate and transmit a new discovery signal, i.e., a discovery signal (DS) and a discovery reference signal (DRS), in addition to the existing primary synchronization signal (PSS)/secondary synchronization signal (SSS).

That is, in the small cell environment, it may be necessary to introduce a cell search procedure or cell discovery procedure using the discovery signal (DS or DRS).

However, the introduction of the discovery signal may cause a problem in that a base station must provide a great amount of additional configuration information.

SUMMARY OF THE INVENTION

Accordingly, an object of the present invention is to solve the above-mentioned problems.

In order to achieve the aforementioned object, according to a disclosure of the present specification, there is provided a method for detecting a discovery signal from multiple transmission points (TPs) using the same physical cell identifier (PCID). The method may include: determining a scrambling identifier of the discovery signal for each of the multiple TPs on the basis of the PCID which is commonly used by the multiple TPs and a resource elements (RE) of each of discovery signals transmitted from the respective multiple TPs; and detecting the discovery signal by demodulating the discovery signal on each position of the RE by using the determined scrambling identifier.

Herein, the determining of the scrambling identifier for each of the multiple TPs may be achieved on the basis of the PCID and a resource configuration for the RE of each discovery signal.

In addition, the discovery signal may be a signal based on one or more of a cell-specific reference signal (CRS), a channel-state information reference signal (CSI-RS), a primary synchronization signal (PSS), and a secondary synchronization signal (SSS).

In addition, if the discovery signal is the signal based on the CSI-RS, the resource configuration for the discovery signal may be resourceConfig-r11 which is a CSI reference signal configuration constituting a CSI-RS-ConfigNZP information element (IE).

In addition, the scrambling identifier may be scramblingIdentity-r11 constituting an SI-RS-ConfigNZP IE.

In addition, the scrambling identifier may be determined on the basis of the PCID, a resource configuration for the RE of each discovery signal, and an offset.

In addition, the offset may be configured through higher layer signaling.

In addition, the offset may be configured differently for each PCID.

In addition, the offset may be a value corresponding to a difference between a subframe position at which transmission of the discovery signal starts and a subframe position at which the discovery signal is transmitted.

In addition, the offset may be determined on the basis of a subframe index.

In order to achieve the aforementioned object, according to a disclosure of the present specification, there is provided a terminal for detecting a discovery signal from multiple TPs using the same PCID. The terminal may include: a radio frequency (RF) unit; and a processor configured to determine a scrambling identifier of the discovery signal for each of the multiple TPs on the basis of the PCID which is commonly used by the multiple TPs and an RE of each of discovery signals transmitted from the respective multiple TPs, and detect the discovery signal by demodulating the discovery signal on each position of the RE by using the determined scrambling identifier.

According to a disclosure of the present specification, the aforementioned conventional technical problem is solved. More specifically, according to the disclosure of the present specification, there is an advantage in that a scrambling identifier (ID) for a discovery signal is effectively determined, thereby decreasing an additional complexity and overhead required to detect the discovery signal.

BRIEF DESCRIPTION OF THE DRAWINGS

FIG. 10 illustrates an example of RBs to which CSI-RSs are mapped in reference signals.

FIG. 15 illustrates a symbol on which a CRS, a PSS/SSS, and a PDCCH are transmitted according to a disclosure of the present specification.

DESCRIPTION OF EXEMPLARY EMBODIMENTS

Figure 1:
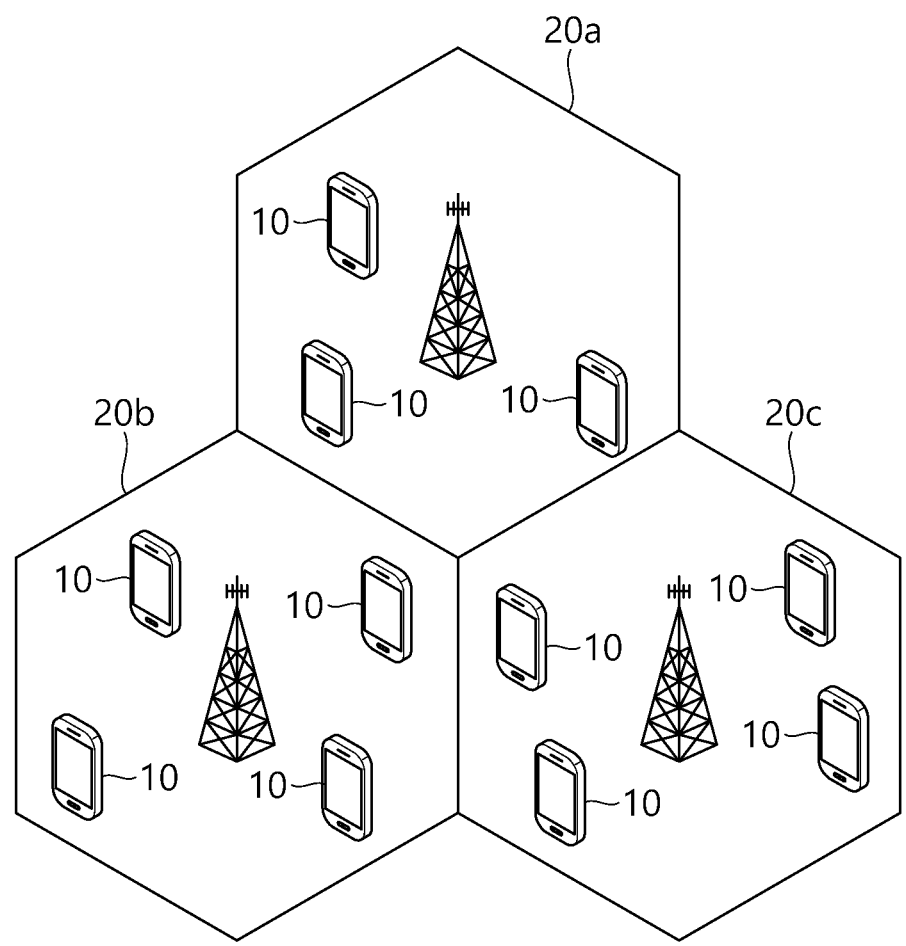
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
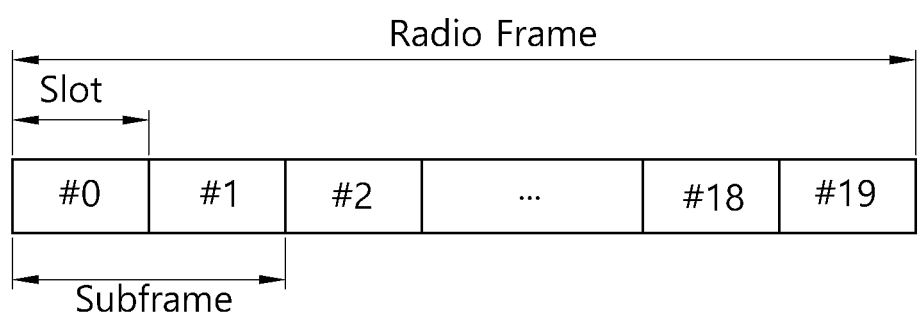
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Meanwhile, one slot may include a plurality of OFDM symbols. The number of OFDM symbols included in one slot may vary depending on a cyclic prefix (CP).

Figure 3:
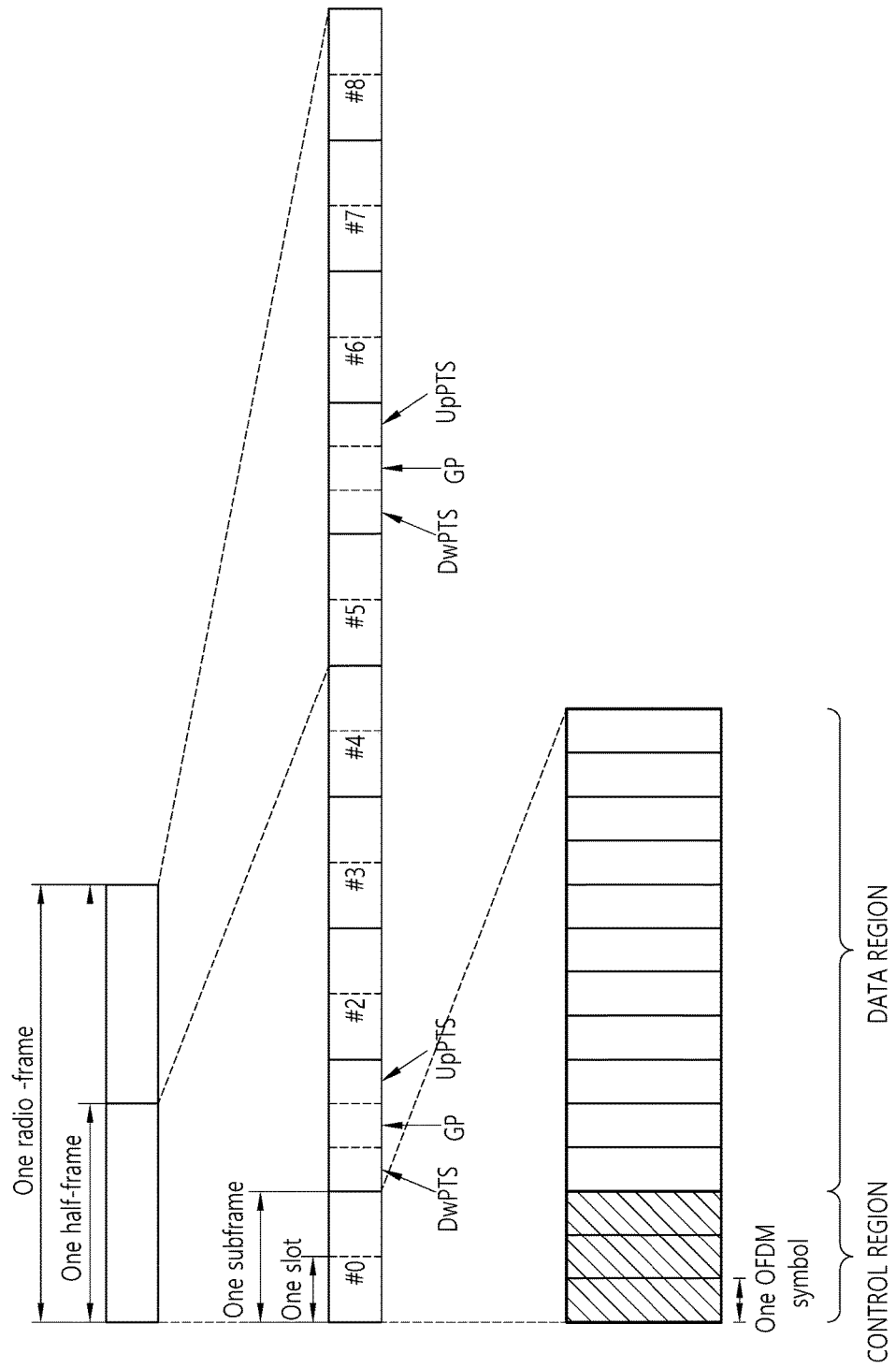
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell FIG. 4 illustrates an example resource grid for one uplink or downlink slot in 3GPP LTE.

Figure 4:
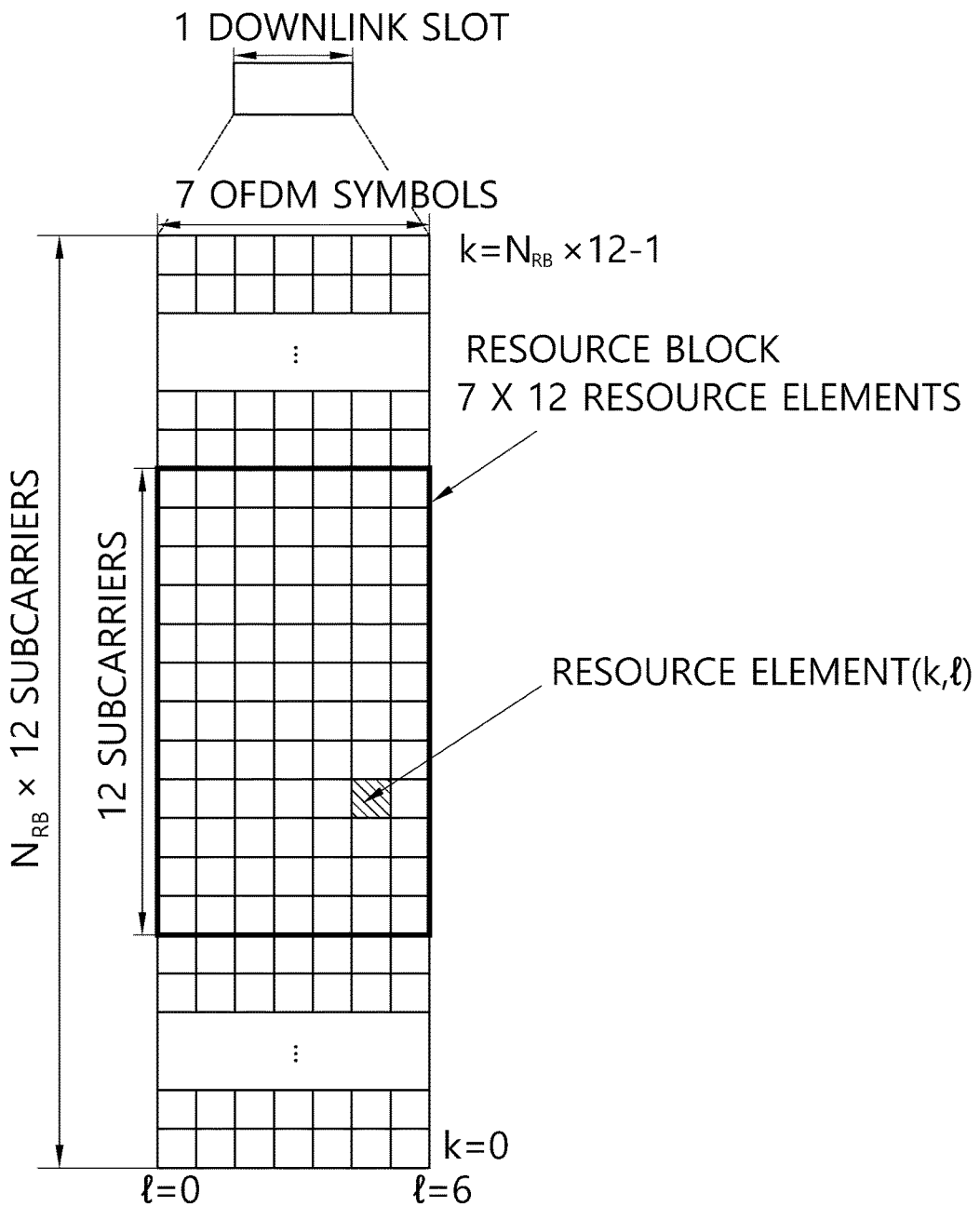
FIG. 4 is an exemplary diagram illustrating a resource grid for one uplink or downlink slot in the 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
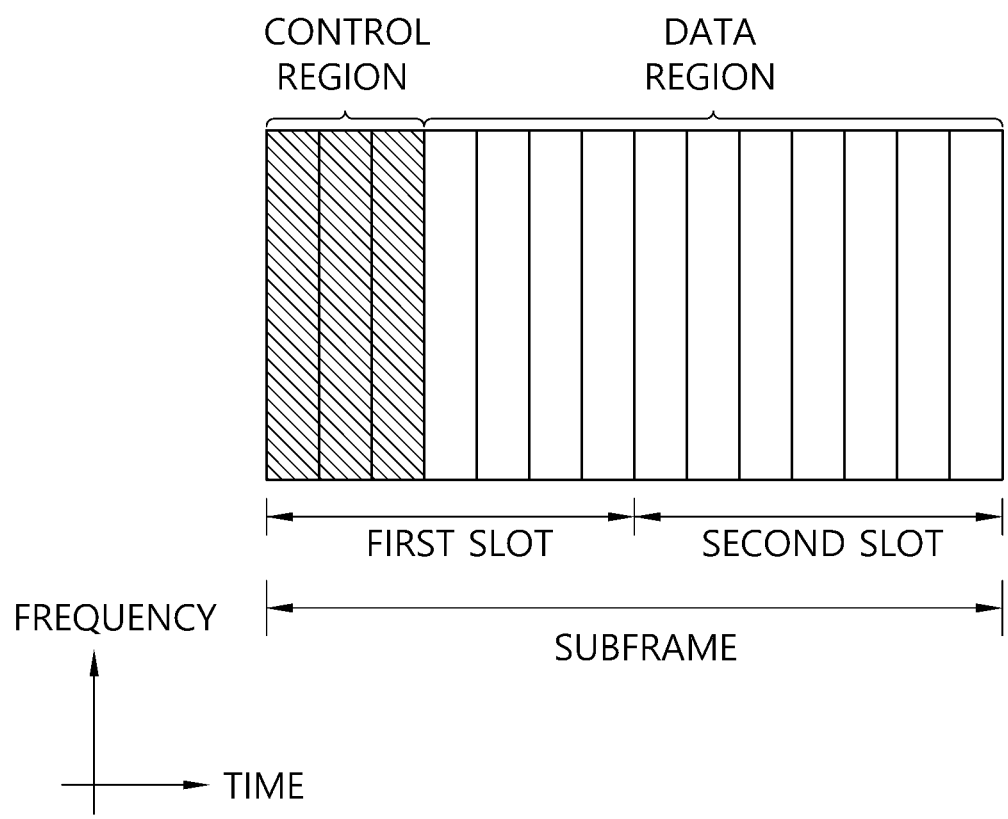
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |

TABLE 3-continued

| Transmission mode | DCI format | Search space | Transmission mode of PDSCH according to PDCCH |
|---|---|---|---|
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

Figure 6:
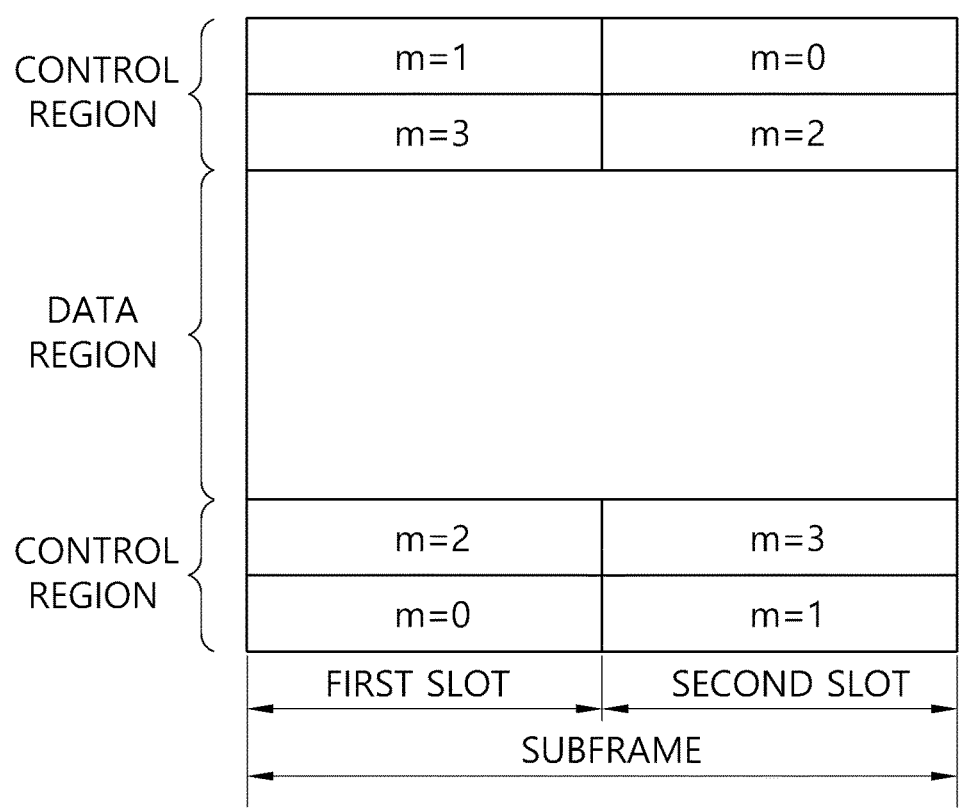
FIG. 6. illustrates a structure of an uplink subframe in 3GPP LTE.

FIG. 6. illustrates a structure of an uplink subframe in 3GPP LTE.

Referring to FIG. 6, an uplink subframe may be divided into a control region and a data region in a frequency domain. The control region is allocated a PUCCH for transmission of uplink control information. The data region is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

<Carrier Aggregation>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Synchronization Signal>

In LTE/LTE-A systems, synchronization with a cell is obtained through a synchronization signal (SS) in a cell search process.

The synchronization signal is described in detail below with reference to FIG. 7.

Figure 7:
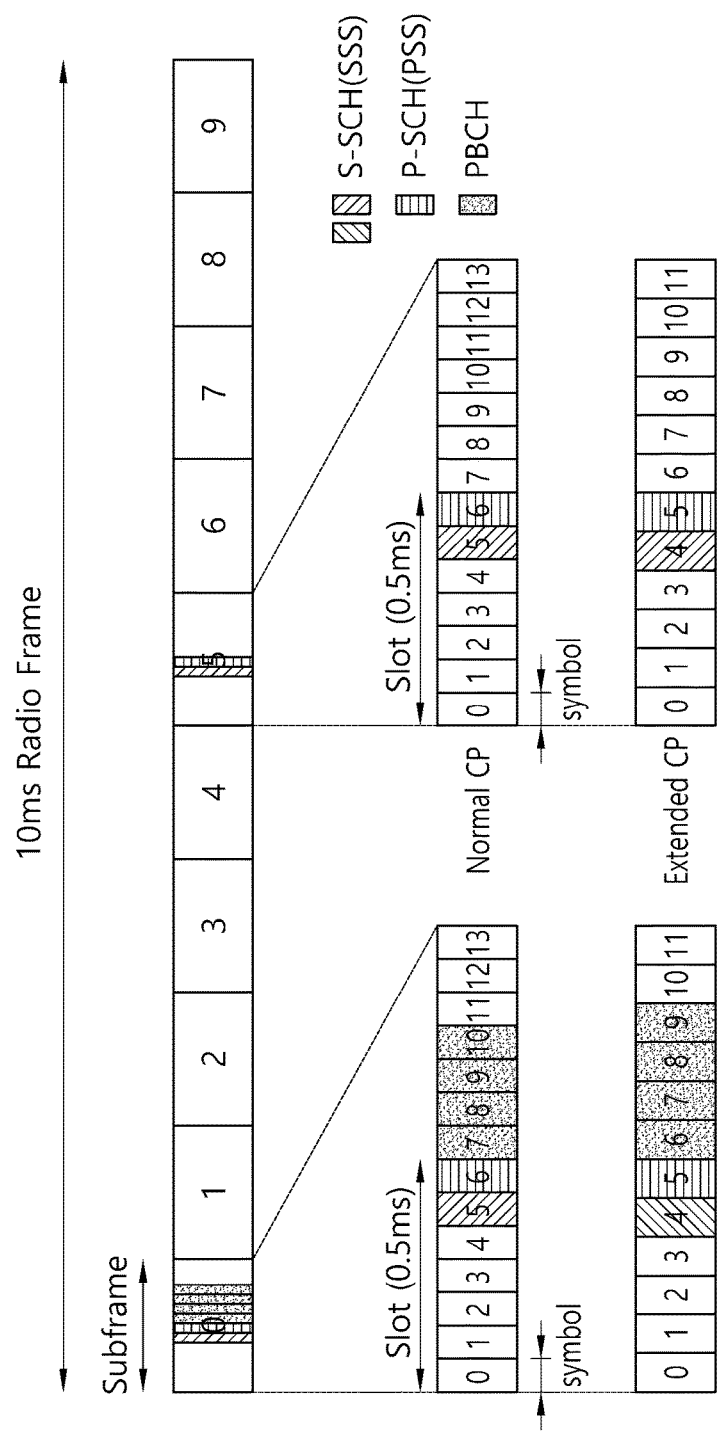
FIG. 7 illustrates a frame structure for transmission of a synchronization signal in an FDD frame.

FIG. 7 illustrates a frame structure for the transmission of a synchronization signal in an FDD frame.

A slot number and a subframe number starts with 0. UE may perform time and frequency synchronization based on a synchronization signal received from an eNodeB. In 3GPP LTE-A, a synchronization signal is used for cell search and may be divided into a primary synchronization signal (PSS) and a secondary synchronization signal (SSS). In 3GPP LTE-A, for a synchronization signal, reference may be made to Paragraph 6.11 of 3GPP TS V10.2.0 (2011-06).

A PSS is used to obtain OFDM symbol synchronization or slot synchronization and associated with a physical-layer cell identity (PCI). Furthermore, an SSS is used to obtain frame synchronization. Furthermore, an SSS is used to detect a CP length and to obtain a physical layer cell group ID.

A synchronization signal may be transmitted in a subframe No. 0 and a subframe No. 5 several time by taking into consideration 4.6 ms, that is, the length of a GSM (global system for mobile communication) frame in order to facilitate inter-RAT (radio access technology) measurement. The boundary of the frame may be detected through an SSS. More specifically, in an FDD system, a PSS is transmitted in the last OFDM symbol of a slot No. 1 or a slot No. 10, and an SSS is transmitted in an OFDM symbol right before a PSS.

A synchronization signal may send any one of a total of 504 physical cell IDs through a combination of three PSSs and 168 SSSs. A PBCH (physical broadcast channel) is transmitted in the first 4 OFDM symbols of the first slot. A synchronization signal and PBCH are transmitted within center 6 RBs within a system bandwidth so that UE can detect or demodulate the synchronization signal regardless of a transmission bandwidth. A physical channel in which a PSS is transmitted is called a P-SCH, and a physical channel in which an SSS is transmitted is called an S-SCH.

Figure 8:
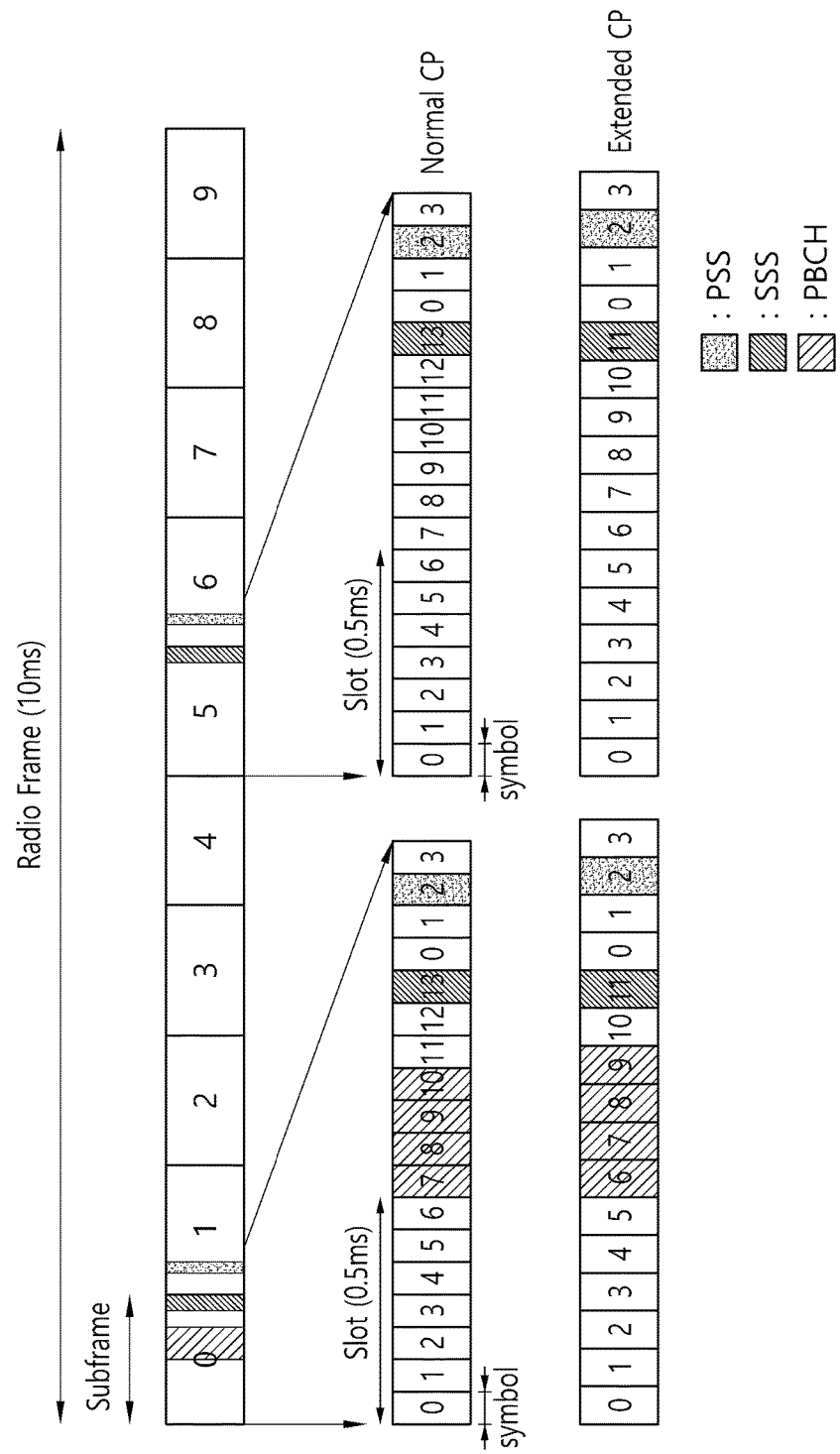
FIG. 8 illustrates an example of a frame structure for sending a synchronization signal in a TDD frame.

FIG. 8 illustrates an example of a frame structure for sending a synchronization signal in a TDD frame.

In a TDD frame, a PSS is transmitted in the third OFDM symbols of a third slot and thirteenth slot. An SSS is transmitted prior to three OFDM symbols in OFDM symbols in which a PSS is transmitted. A PBCH is transmitted in the first 4 OFDM symbols of a second slot in the first subframe.

<Reference Signal>

A RS is described below.

In general, transmission information, for example, data is easily distorted and changed while it is transmitted through a radio channel. Accordingly, a reference signal is required in order to demodulate such a transmission information without an error. The reference signal is a signal known to both a transmitter and a receiver and is transmitted along with transmission information. Since transmission information transmitted by a transmitter experiences a corresponding channel for each transmission antenna or layer, a reference signal may be allocated to each transmission antenna or layer. A reference signal for each transmission antenna or layer may be identified using resources, such as a frequency and code. A reference signal may be used for two purposes, that is, the demodulation and channel estimation of transmission information.

A downlink reference signal may be divided into a cell-specific reference signal (CRS), an MBSFN (multimedia broadcast and multicast single frequency network) reference signal, a UE-specific reference signal (UE-specific RS, URS), a positioning reference signal (positioning RS, PRS), and a CSI reference signal (CSI-RS). The CRS is a reference signal transmitted to all UEs within a cell and also called a common reference signal. The CRS may be used for the channel measurement of CQI feedback and the channel estimation of PDSCH. The MBSFN reference signal may be transmitted in a subframe allocated for MBSFN transmission. The URS is a reference signal received by a specific UE or specific UE group within a cell and may be called a demodulation reference signal (DM-RS). The DM-RS is chiefly used for a specific UE or specific UE group to perform data demodulation. The PRS may be used to estimate the location of UE. The CSI-RS is used for the channel estimation of the PDSCH of LTE-A UE. The CSI-RSs are deployed relatively sparsely in a frequency domain or time domain and may be punctured in the data region of a common subframe or MBSFN subframe.

Figure 9:
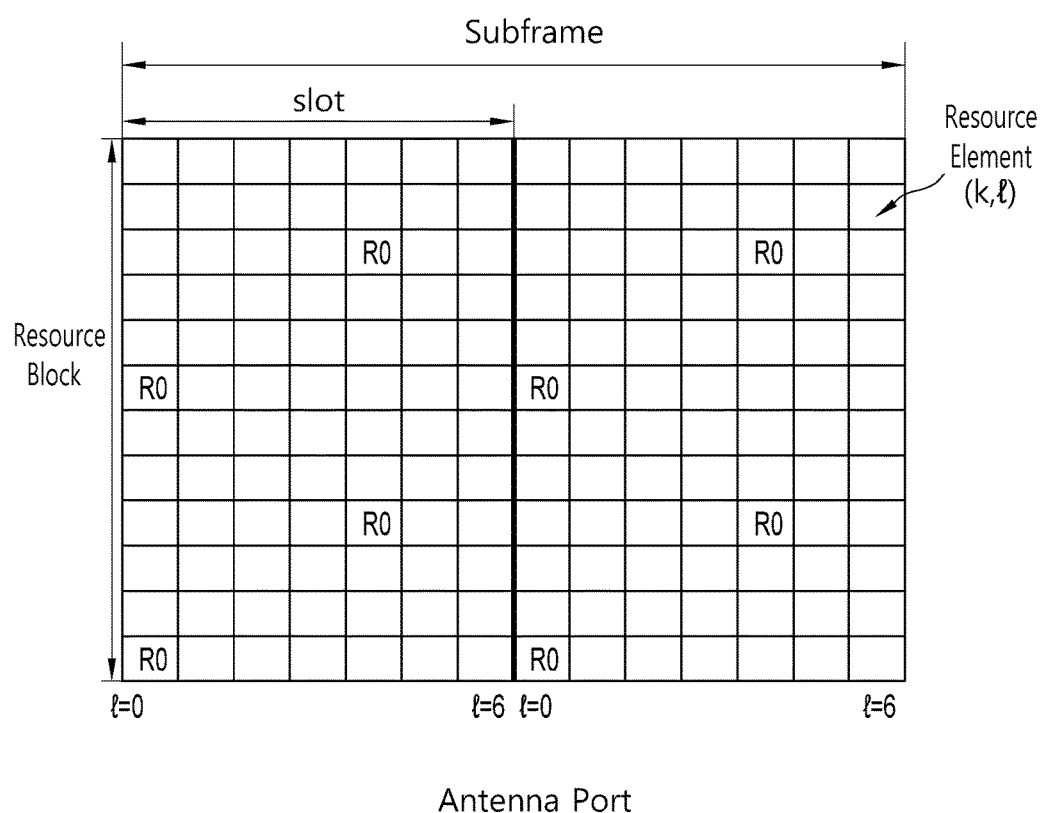
FIG. 9 illustrates an example of a pattern in which CRSs are mapped to RBs if an eNodeB uses a single antenna port.

FIG. 9 illustrates an example of a pattern in which CRSs are mapped to RBs if an eNodeB uses a single antenna port.

Referring to FIG. 9, R0 illustrates an RE to which a CRS transmitted by the antenna port number 0 of an eNodeB is mapped.

The CRS is transmitted in all downlink subframes within a cell that supports PDSCH transmission. The CRS may be transmitted on antenna ports 0 to 3. The CRS may be defined only with respect to Δf=15 kHz. A pseudo-random sequence $r_{l,ns}(m)$ generated from a seed value based on a cell ID (identity) is subject to resource mapping as a complex-valued modulation symbol $a^{(p)}_{k,l}$. In this case, $n_s$ is a slot number within a single radio frame, p is an antenna port, and l is an OFDM symbol number within the slot. K is a subcarrier index. l,k is represented as in the following equation.

$$k = 6m + (v + v_{shift}) \bmod 6 \quad \text{[Equation 1]}$$

$$l = \begin{cases} 0, N^{DL}_{symb} - 3 & \text{if } p \in \{0, 1\} \\ 1 & \text{if } p \in \{2, 3\} \end{cases}$$

$$v_{shift} = N^{cell}_{ID} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In Equation 1, p denotes an antenna port, and $n_s$ denotes a slot number 0 or 1.

k has 6 shifted indices according to a cell ID ($N^{Cell}_{ID}$). Accordingly, cells having cell IDs 0, 6, 12, . . . , that is, a multiple of 6, send CRSs in the same subcarrier location k.

In Equation 1, l is determined by the antenna port p, and may have a possible value of 0, 4, 7, or 11. Accordingly, the CRS is transmitted on an 0, 4, 7, 11 symbol.

A resource element (RE) allocated to the CRS of a single antenna port may not be used to send another antenna port and needs to be configured to be zero. Furthermore, in an MBSFN (multicast-broadcast single frequency network) subframe, the CRS is transmitted only in a non-MBSFN region.

FIG. 10 illustrates an example of RBs to which CSI-RSs are mapped in reference signals.

A CSI-RS is used for channel measurement for the channel estimation and channel information of the PDSCH of LTE-A UE. CSI-RSs are deployed relatively sparsely in a frequency domain or time domain and may be punctured in the data region of a subframe or MBSFN subframe. If a CSI-RS is required to estimate a CSI, a CQI, PMI, and RI may be reported by UE.

A CSI-RS is transmitted through a 1, 2, 4, or 8 antenna port. Antenna ports used in this case are p=15, p=15, 16, p=15, . . . , 18, and p=15, . . . , 22. That is, a CSI-RS may be transmitted through 1, 2, 4, 8 antenna ports. A CSI-RS may be defined with respect to only a subcarrier duration Δf=15 kHz. For a CSI-RS, reference may be made to Paragraph 6.10.5 of 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)."

In the transmission of a CSI-RS, a maximum of 32 different configurations may be proposed in order to reduce ICI (inter-cell interference) in a multi-cell environment including a heterogeneous network (HetNet) environment. A CSI-RS configuration is different depending on the number of antenna ports within a cell and a CP. A neighbor cell may have a different configuration to the greatest extent. Furthermore, a CSI-RS configuration may be divided into a case where it is applied to both an FDD frame and TDD frame and a case where it is applied to only a TDD frame depending on a frame structure. In a single cell, a plurality of CSI-RS configurations may be used. A zero or one CSI-RS configuration may be used for UE that assumes a non-zero power CSI-RS, and zero or some CSI-RS configurations may be used for UE that assumes a zero power CSI-RS.

A CSI-RS configuration may be indicated by a high layer. For example, a CSI-RS-Config IE (information element) transmitted through a high layer may indicate a CSI-RS configuration. The following table illustrates an example of a CSI-RS-Config IE.

TABLE 5

```
CSI-RS-Config-r10 ::=          SEQUENCE {
csi-RS-r10                     CHOICE {
release                        NULL,
setup                          SEQUENCE {
antennaPortsCount-r10                  ENUMERATED {an1, an2, an4, an8},
resourceConfig-r10             INTEGER (0..31),
subframeConfig-r10                     INTEGER (0..154),
p-C-r10                                INTEGER (-8..15)
}
}                                              OPTIONAL,           -- Need ON
zeroTxPowerCSI-RS-r10  CHOICE {
release                NULL,
setup                  SEQUENCE {
zeroTxPowerResourceConfigList-r10  BIT STRING (SIZE (16)),
zeroTxPowerSubframeConfig-r10          INTEGER (0..154)
}
}                                              OPTIONAL            -- Need ON
}
-- ASN1STOP
```

Referring to Table 5, an "antennaPortsCount" field indicates the number of antenna ports used for the transmission of a CSI-RS. A "resourceConfig" field indicates a CSI-RS configuration. A "SubframeConfig" field and a "zeroTxPowerSubframeConfig" field indicate a subframe configuration in which a CSI-RS is transmitted.

A "zeroTxPowerResourceConfigList" field indicates the configuration of a zero power CSI-RS. In a 16-bit bitmap that configures the "zeroTxPowerResourceConfigList" field, a CSI-RS configuration corresponding to bits configured to be 1 may be configured as a zero power CSI-RS.

The sequence $r_{l,n_s}(m)$ of a CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 2]

$$m = 0, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for } normalCP \\ 0 & \text{for } extendedCP \end{cases}$$

In Equation 2, $n_s$ is a slot number within a radio frame, and l is an OFDM symbol number within the slot. c(i) is a pseudo random sequence and started from each OFDM symbol as $c_{init}$ indicated in Equation. $N_{ID}^{cell}$ means a physical cell ID.

In subframes configured to send a CSI-RS, a reference signal sequence $r_{l,n_s}(m)$ is mapped to a complex value modulation symbols $a_{k,l}^{(p)}$ used as a reference symbol for an antenna port p.

The relation between $r_{l,n_s}(m)$ and $a_{k,l}^{(p)}$ may be represented as in the following equation.

$$a_{k,l}^{(p)} = w_{l''} \cdot r(m)$$ [Equation 3]

In this case, $$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, (k", l") and $n_s$ are given in Table 5 and Table 6 to be described later. A CSI-RS may be transmitted in a downlink slot in which ($n_s$ mod 2) satisfies the conditions of Table 5 and Table 6 (In this case, mod means modular operation. That is, ($n_s$ mod 2) means the remainder obtained by dividing $n_s$ by 2).

The table 6 illustrates CSI-RS configurations in a normal CP and table 7 illustrates CSI-RS configuration in an extended CP.

TABLE 6

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 6-continued

| CSI-RS configuration index | Number of configured CSI-RSs | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| TDD frame 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 7

| CSI-RS configuration index | Number of configured CSI-RSs | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| TDD and FDD frame 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| TDD frame 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

In the above two tables, UE may send a CSI-RS only in a downlink slot that satisfies the condition of ns mod 2. Furthermore, UE does not send a CSI-RS in a subframe in which the transmission of a special subframe, CSI-RS of a TDD frame collides against a synchronization signal, a PBCH (physical broadcast channel), and a system information block type 1 (SystemInformationBlockType1) or a subframe in which a paging message 가 is transmitted. Furthermore, in a se S, that is, S={15}, S={15, 16}, S={17, 18}, S={19, 20} or S={21, 22}, a resource element in which the CSI-RS of a single antenna port is transmitted is not used for the transmission of the CSI-RS of a PDSCH or another antenna port.

The following table illustrates an example of a subframe configuration in which a CSI-RS is transmitted.

TABLE 8

| CSI-RS-SubframeConfig $I_{CSI-RS}$ | CSI-RS cycle $T_{CSI-RS}$ (subframe) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 8, the cycle TCSI-RS and offset ΔCSI-RS of a subframe in which a CSI-RS is transmitted may be determined depending on a CSI-RS subframe configuration ICSI-RS. In Table 13, the CSI-RS subframe configuration may be any one of the "SubframeConfig" field and "ZeroTxPowerSubframeConfig" field of the CSI-RS- Config IE in the above table. The CSI-RS subframe configuration may be separately configured with respect to a non-zero power CSI-RS and a zero power CSI-RS.

Figure 11:
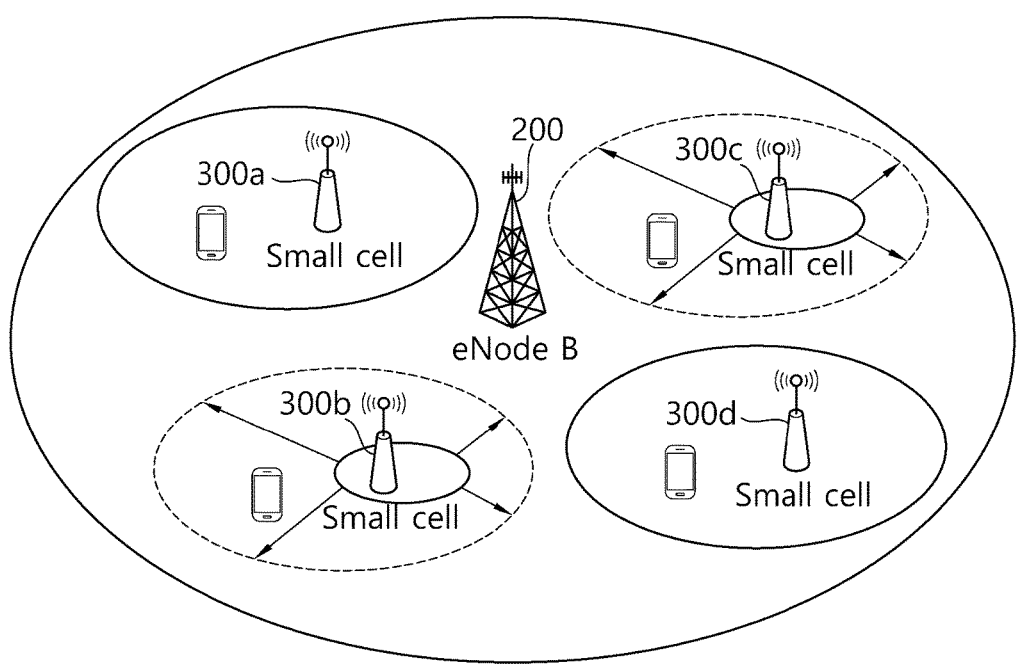
FIG. 11 illustrates a heterogeneous network environment in which a macro cell and a small cell co-exist and which is possibly used in a next-generation wireless communication system.

FIG. 10 illustrates resource elements used for CSI-RSs when a CSI-RS configuration index is 0 in a normal CP structure. Rp illustrates a resource element used for CSI-RS transmission on an antenna port p. Referring to FIG. 11, a CSI-RS for antenna ports 15 and 16 is transmitted through resource elements corresponding to the third subcarrier (i.e., subcarrier index 2) of the sixth and the seventh OFDM symbols (i.e., OFDM symbol indices 5, 6) of a first slot. A CSI-RS for antenna ports 17 and 18 is transmitted through resource elements corresponding to the ninth subcarrier (i.e., subcarrier index 8) of the sixth and the seventh OFDM symbols (OFDM symbols indices 5, 6) of the first slot. A CSI-RS for antenna ports 19 and 20 is transmitted through the same resource elements as those in which the CSI-RS for the antenna ports 15 and 16 is transmitted. A CSI-RS for the antenna ports 21 and 22 is transmitted through the same resource elements as those in which the CSI-RS for the antenna ports 17 and 18 are transmitted.

If a CSI-RS through eight antenna ports is transmitted to UE, the UE may receive an RB to which R15 to R22 has been mapped. That is, the UE may receive a CSI-RS having a specific pattern.

<Disclosures of the Present Specification>

Hereinafter, disclosures of the present specifications will be described.

First, a small cell and a discovery signal will be described which are applicable to the disclosures of the present specification.

<Small Cell and Discovery Signal>

Meanwhile, in a next-generation mobile communication system, it is expected that a small cell of which a cell coverage radius is small is added in the coverage of a legacy cell and that the small cell handles a greater amount of traffic. The legacy cell has a greater coverage than that of the small cell, and thus is also referred to as a macro cell. Hereinafter, it is described with reference to the drawing.

FIG. 11 illustrates a heterogeneous network environment in which a macro cell and a small cell co-exist and which is possibly used in a next-generation wireless communication system.

Referring to FIG. 11, it is shown a heterogeneous network environment in which a macro cell served by a legacy eNodeB 200 overlaps with a small cell served by one or more small eNodeBs 300a, 300b, 300c, and 300d. The legacy eNodeB provides a greater coverage than the small eNodeB, and thus is also called a macro eNodeB (MeNB). In the present specification, the macro cell and the MeNB may be used together. A UE having access to the macro cell 200 may be referred to as a macro UE. The macro UE receives a downlink signal from the MeNB, and transmits an uplink signal to the MeNB.

In such a heterogeneous network, coverage holes of the macro cell can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

Meanwhile, since small cells are deployed as described above, an inter-cell interference problem may become more serious. To solve this problem, as illustrated, a coverage size of the small cell may be decreased according to a situation. Alternatively, the small cell may be off and then on again according to the situation.

Figure 12:
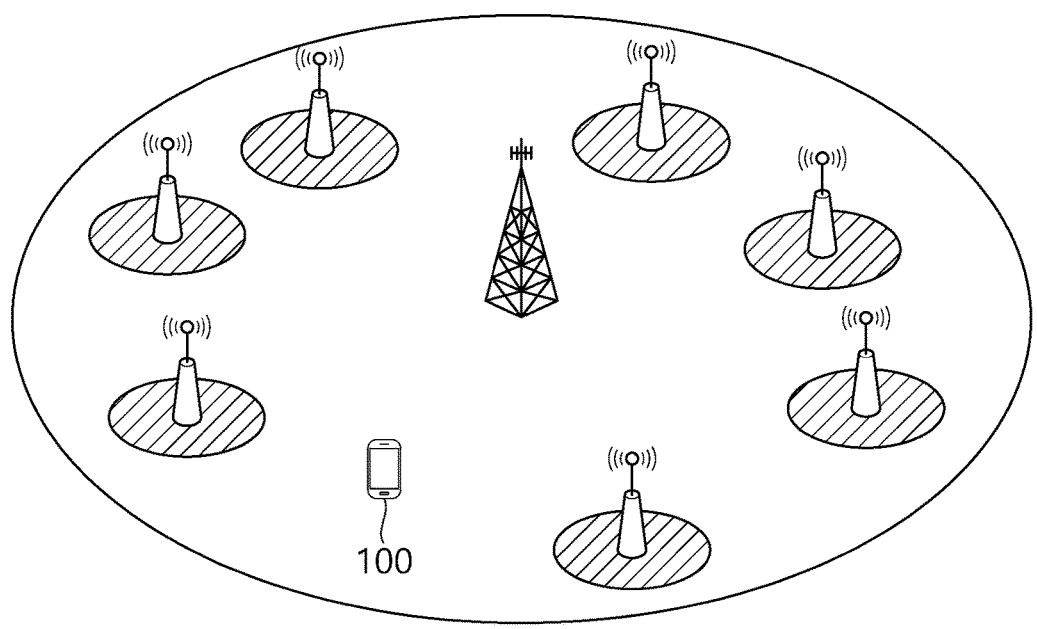
FIG. 12 illustrates an example of a situation in which a small cell is densely deployed.

FIG. 12 illustrates an example of a situation in which a small cell is densely deployed.

Referring to FIG. 12, it is shown a situation in which a small cell is densely deployed in the coverage of a macro cell. In this situation, a UE 100 may have difficulty to detect the small cells within a short time. In particular, the aforementioned cell detection is performed through PSS/SSS reception. However, when a great number of small cells transmit the PSS/SSS at the same timing, i.e., on subframes #0 and #5, the UE 100 may have difficulty to entirely receive it at once. Furthermore, when the small cells simultaneously transmit the PSS/SSS on the subframes #0 and #5, mutual interference occurs, which may cause difficulty for the UE 100 to receive it correctly.

Figure 13:
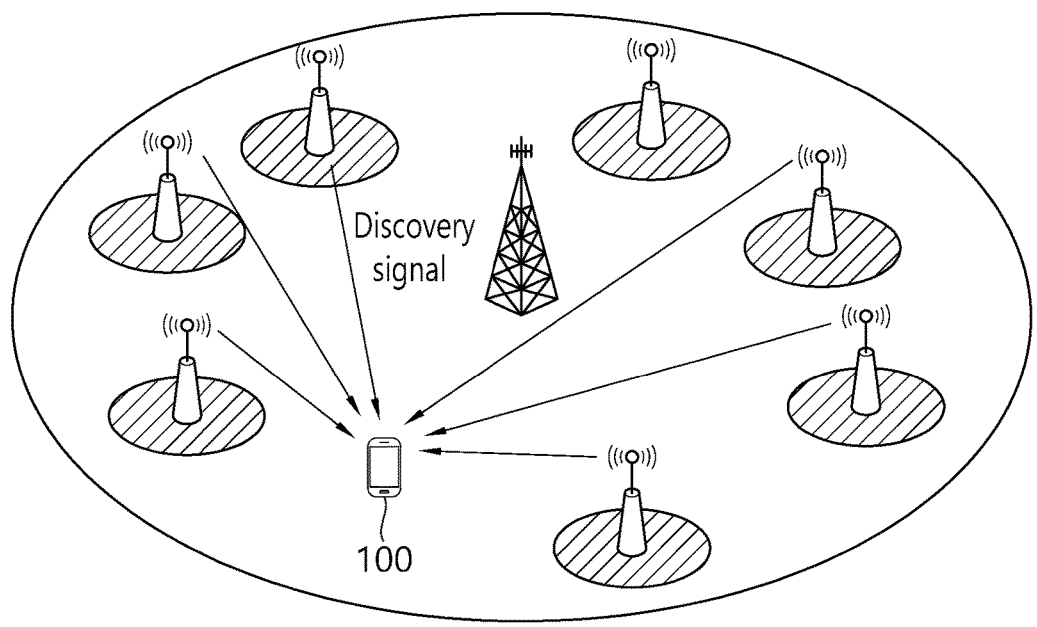
FIG. 13 illustrates an example of transmitting a discovery signal by a small cell according to a disclosure of the present specification.

FIG. 13 illustrates an example of transmitting a discovery signal by a small cell according to a disclosure of the present specification.

To solve the aforementioned problem, as can be seen from FIG. 13, one disclosure of the present specification proposes to transmit a new discovery signal (DS) in addition to the legacy PSS/SSS by a small cell so that a UE can effectively detect the small cells. The DS may also be called a discovery reference signal (DRS). Accordingly, the UE must perform a cell search procedure or a cell detection procedure by using the DS in addition to the legacy PSS/SSS.

Herein, the DS may imply a signal periodically transmitted with a long period.

The DS may also be transmitted by not only a small cell but also a remote radio head (RRH), a transmission point (TP), etc.

The DS may have the following feature.

More cells can be detected in comparison with the legacy PSS/SSS and CRS.

More cells can be detected within a short time, e.g., one subframe.

Measurement can be performed within a short time, e.g., one subframe.

Measurement is supported for a small cell performing an on/off operation.

The DS may be implemented with the following signals.
(a) PSS/SSS/CSI-RS/CRS or PSS/SSS/configurable CRS
(b) PSS/SSS/CRS
(c) PSS/SSS/CSI-RS
(d) PSS/SSS/CSI-RS/CRS or PSS/SSS/configurable CSI-RS The DS may be used for coarse time/frequency tracking and measuring.

Meanwhile, the DS must satisfy the following requirements.

The DS must support coarse time synchronization with assumption of a very high initial timing error (e.g., +−2.5 ms).

The DS must support coarse frequency synchronization with assumption of a very high initial frequency error (e.g., 20 KHz).

The DS must support the detection of at least three cells.

Meanwhile, a period of the DS is determined by considering the following constraints.

Multiple measurement gap periods: 40 msec, 80 msec, 160 msec, or 320 msec

Align with DRX cycle: 10, 20, 32, 40, 64, 80, 128, 160, 256, 320, 512, 640, 1024, 1280, 2048, 2560

If the PSS/SSS are transmitted as a part of the discovery signal, the period of the discovery signal must be a multiple of 5 msec, so that typical PSS/SSS transmitted in an on-state are replaced by the PSS/SSS of the discovery signal. However, this constraint may not be applied if the small cell does not transmit the discovery signal in the on-state. Alternatively, in order to minimize an influence of the legacy UE, not a UE improved according to the disclosure of the present specification, the PSS/SSS for the discovery signal may be additionally transmitted in addition to the legacy PSS/SSS. As such, the PSS/SSS additionally transmitted for the discovery signal in addition to the legacy PSS/SSS may also be called a DS-PSS (or DRS-PSS)/DS-SSS (or DRS-SSS). In this case, a cell ID based on the DS-PSS (or the DRS-PSS)/DS-SSS (or DRS-SSS) may be different from a cell ID based on the PSS/SSS.

On the other hand, if one or more of the CRS and the CSI-RS is additionally transmitted for the discovery signal in addition to the conventional CRS, the CRS and the CSI-RS may be called respectively a DS-CRS (or DRS-CRS) and a DS-CSI-RS (or DRS-CSI-RS). In addition, if a PRS is additionally transmitted for the discovery signal other than the conventional PRS, the PRS may be called a DS-PRS (or DRS-PRS).

Meanwhile, when a discovery signal (DS or DRS) transmitted by a specific small cell is transmitted in the aforementioned operations (a) to (d), a sequence and resource of the DRS-PSS and the DRS-SSS may be configured as similar as possible to the legacy PSS and the SSS. However, a difference with the legacy PSS/SSS may lie in that it is transmitted on a different scrambling initial parameter and/or resource location (e.g., different frequency/time resources).

Respective signals (e.g., DRS-PSS, DRS-SSS, DRS-CRS, DRS-CSI-RS, and/or DRS-PRS) constituting the discovery signal may be all transmitted according to the same transmission period/offset. Alternatively, respective components may be transmitted according to different transmission periods/offsets. For example, this will be described with reference to FIG. 14.

Figure 14:
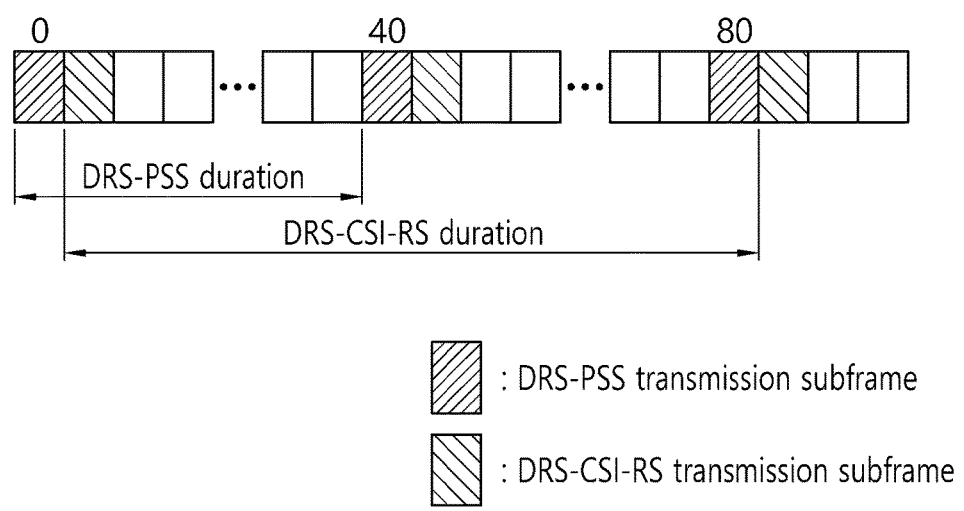
FIG. 14 illustrates an exemplary period of a discovery signal transmitted according to a disclosure of the present specification.

FIG. 14 illustrates an exemplary period of a discovery signal transmitted according to a disclosure of the present specification.

As can be seen from FIG. 14, when the discovery signal includes a DRS-PSS (and/or DRS-SSS) and a DRS-CSI-RS, the DRS-PSS (and/or DRS-SSS) may be transmitted for example with a period of 40 msec, whereas the DRS-CSI-RS may be transmitted with a period of 80 msec.

The following description will focus on a method of configuring and transmitting the DRS-PSS and the DRS-SSS as a part of a discovery signal. It is apparent that this description is also applicable to other components of the discovery signal. For the discovery signal, 1) the DRS-PSS and the DRS-SSS may be both transmitted, or 2) only the DRS-PSS may be transmitted, or 3) only the DRS-SSS may be transmitted. The description of the present invention is also applicable to all of the above three cases.

I. Location Capable of Transmitting DRS-PSS and DRS-SSS Considering ON State.

A small cell may transmit a discovery signal both in an ON state and an OFF state. Due to transmission of a channel/signal or the like, a location of an OFDM symbol capable of transmitting a DRS-PSS and a DRS-SSS in the ON state is relatively restricted in comparison with a location of an OFDM symbol capable of performing transmission in an OFF state.

The following description is applicable to both a case where only the DRS-PSS or the DRS-SSS is transmitted between the DRS-PSS and the DRS-SSS or a case where both of the DRS-PSS and the DRS-SSS are transmitted. In addition, it is also applicable to all cases where the DRS-PSS and/or DRS-PSS to be transmitted on multiple OFDM symbols are plural in number.

Although the following description focuses on a case where a normal CP is used in an FDD system, it is apparent that the similar principle is also applicable to a case where a TDD system or an extended CP is used.

1. Same Location with Legacy PSS and SSS

A DRS-PSS (DRS-SSS) may be transmitted on the same OFDM symbol location as the legacy PSS and the legacy SSS. In this case, the DRS-PSS (or DRS-SSS) must be transmitted by using the same RE source and sequence as the legacy PSS (or legacy SSS).

In this case, when the DRS-PSS (or DRS-SSS) is transmitted in a region other than subframes #0 and #5, there may be a problem in that the legacy UE recognizes this as the legacy PSS (legacy SSS).

2. Consideration of OFDM Symbol for Transmitting PDCCH, PSS, SSS, CRS, and PBCH

Transmission locations of a DRS-PSS and a DRS-SSS may be determined by considering transmission locations of a PDCCH, a PSS, an SSS, a CRS, and a PBCH. More specifically, this will be described with reference to FIG. 15.

FIG. 15 illustrates a symbol on which a CRS, a PSS/SSS, and a PDCCH are transmitted according to a disclosure of the present specification.

As can be seen from FIG. 15, when considering a case where a DRS-PSS and a DRS-SSS are transmitted in a subframe #0, the transmission locations of the DRS-PSS and the DRS-SSS may be determined by considering transmission locations of a PDCCH, a PSS, an SSS, and a CRS and an OFDM symbol location of a PBCH transmitted on OFDM symbols #0, #1, #2, and #3 in a second slot. In this case, an OFDM symbol #3 in a first slot and OFDM symbols #5 and #6 in the second slot may be determined as a symbol capable of transmitting the DRS-PSS and the DRS-SSS.

3. Consideration of OFDM Symbol for Transmitting PDCCH, PSS, SSS, and CRS

When considering a case where a DRS-PSS and a DRS-SSS are transmitted on a subframe #5, transmission locations of the DRS-PSS and the DRS-SSS may be determined by considering transmission locations of a PDCCH, a PSS, an SSS, and a DRS as shown in FIG. 15. In this case, an OFDM symbol #3 in a first slot and OFDM symbols #2, #3, #5, and #6 in a second slot may be considered as a symbol capable of transmitting the DRS-PSS and the DRS-SSS.

4. Consideration of OFDM Symbol for Transmitting PDCCH and CRS

When considering a case where a DRS-PSS and a DRS-SSS are not transmitted on subframes #0 and #5, transmission locations of the DRS-PSS and the DRS-SSS may be determined by considering transmission locations of PDCCH and CRS. In this case, OFDM symbols #3, #5, and #6 in a first slot and OFDM symbols #2, #3, #5, and #6 in a second slot may be considered as a symbol capable of transmitting the DRS-PSS and the DRS-SSS.

On the other hand, an OFDM symbol for transmitting a CSI-RS may be additionally considered.

A location of an OFDM symbol capable of transmitting the CSI-RS may be considered in addition to the OFDM symbol capable of transmitting the DRS-PSS and DRS-SSS considered in the above options 1, 2, 3, and 4. A location of an OFDM symbol capable of transmitting the CSI-RS is OFDM symbols #5 and #6 in a first slot and OFDM symbols #2, #3, #5, and #6 in a second slot in case of FDD, and is OFDM symbols #5 and #6 in a first slot and OFDM symbols #1, #2, #3, #5, and #6 in a second slot in case of TDD. Therefore, the DRS-PSS and the DRS-SSS may be transmitted through an OFDM symbol location by excluding the location of the OFDM symbol capable of transmitting the CSI-RS from the OFDM symbol locations considered in the options 1 to 4.

In this case, if the location of the OFDM symbol capable of transmitting the CSI-RS is excluded, there may be a problem in that the number of symbols capable of transmitting the DRS-PSS and the DRS-SSS is insufficient. For example, if a transmission location of the PDCCH, the PSS, the SSS, the CRS, and the PBCH and a transmission location of the CSI-RS are considered in an FDD system, only an OFDM symbol #3 in a first slot is a symbol location that can be used to transmit the DRS-PSS and the DRS-SSS. However, in this case, if it is intended to transmit both of the DRS-PSS and the DRS-SSS or if it is intended to decrease an influence of interference by varying a location of an OFDM symbol for transmitting the DRS-PSS and/or the DRS-SSS in each cell, the number of OFDM symbols capable of transmitting the DRS-PSS and the DRS-SSS is insufficient.

For this, it may be considered to transmit the DRS-PSS and the DRS-SSS through an OFDM symbol region in which the PDCCH can be transmitted. In this case, in order to transmit the DRS-PSS and the DRS-SSS in the OFDM symbol region in which the PDCCH can be transmitted, the number of OFDM symbols capable of transmitting the PDCCH may be restricted. For example, it may be restricted that the PDCCH is transmitted through maximum one OFDM symbol or maximum two OFDM symbols on a subframe for transmitting the DRS-PSS and the DRS-SSS. Accordingly, the number of OFDM symbols capable of transmitting the DRS-PSS and the DRS-SSS may be increased. However, there may be a situation where a transmission region of an OFDM symbol for transmitting a PDCCH recognized by a UE (through a PCFICH) overlaps with a transmission region of the DRS-PSS and the DRS-SSS. In this case, the UE may perform the following operation.

If the OFDM symbol region for transmitting the PDCCH (recognized through the PCFICH) overlaps with an OFDM symbol region for transmitting the DRS-PSS and the DRS-SSS, the UE may first transmit the DRS-PSS and the DRS-SSS. For this, as to an overlapping RE region among transmission regions of the PDCCH and the DRS-PSS and DRS-SSS, the UE may assume that the PDCCH is punctured and the DRS-PSS and the DRS-SSS are transmitted.

If the OFDM symbol region for transmitting the PDCCH recognized through the PCFICH overlaps with the transmission region of the DRS-PSS and the DRS-SSS, the UE may decide that a value received from the PCFICH has an error. That is, it may be decided that an error occurs in PCFICH reception, and reception of the DRS-PSS and the DRS-SSS may be performed in a region in which the OFDM symbol region for transmitting the PDCCH overlaps with the transmission region of the DRS-PSS and the DRS-SSS.

If the OFDM symbol region for transmitting the PDCCH (recognized through the PCFICH) overlaps with the transmission region of the DRS-PSS and the DRS-SSS, the UE may assume that the DRS-PSS and the DRS-SSS are not transmitted in a corresponding subframe or in a corresponding OFDM symbol. That is, it may be decided that the PCFICH is correctly detected and it may be regarded that the PDCCH will be transmitted in a corresponding OFDM symbol region, and thus reception of the DRS-PSS and the DRS-SSS may not be performed in a corresponding subframe or a corresponding OFDM symbol.

II. Method of Determining Transmission Location of DRS-PSS and DRS-SSS

A DRS-PSS and/or a DRS-SSS may be transmitted through an OFDM symbol location determined as described above. If the DRS-PSS and the DRS-SSS are both transmitted, the DRS-PSS and the DRS-SSS may be both transmitted on a new location at which the legacy PSS and the legacy SSS are not transmitted, or only the DRS-PSS (or on the contrary, DRS-SSS) may be transmitted on a new OFDM symbol location described in the above section I and the DRS-SSS (or on the contrary, DRS-PSS) may be transmitted on an OFDM symbol location at which the legacy SSS (legacy PSS) is transmitted. If only the DRS-PSS (or on the contrary, DRS-SSS) is transmitted between the DRS-PSS and the DRS-SSS as a discovery signal (DS or DRS), the DRS-PSS (or on the contrary, DRS-SSS) may be transmitted on a new OFDM symbol location described above, or may be transmitted on an OFDM symbol location at which the legacy PSS (legacy SSS) is transmitted.

1. In Case of Transmitting Only DRS-PSS (DRS-SSS)

Only a DRS-PSS (or on the contrary, DRS-SSS) may be transmitted as a discovery signal between the DRS-PSS and the DRS-SSS, and the DRS-PSS (or on the contrary, DRS-SSS) may be transmitted on a new OFDM symbol mentioned in the above section I. In this case, a DRS-PSS (or DRS-SSS) of a specific cell may be transmitted on one of new OFDM symbol locations mentioned in the above section I. Alternatively, the DRS-PSS (or DRS-SSS) may be transmitted on a different OFDM symbol location in each cell. In case of transmitting on the different OFDM symbol location in each cell, in particular, an OFDM symbol location on which the DRS-PSS (DRS-SSS) is transmitted may be determined by $N_{ID}^{(1)}$ and/or $N_{ID}^{(2)}$ or a cell ID of a cell for transmitting the DRS-PSS (or DRS-SSS).

2. In Case of Transmitting DRS-PSS and DRS-SSS 2-1. In Case of Transmitting Both of DRS-PSS and DRS-SSS on New OFDM Symbol Location If a DRS-PSS and a DRS-SSS are both transmitted as a discovery signal, the DRS-PSS and the DRS-SSS may be transmitted on a new OFDM symbol location mentioned in the above section I. In this case, a DRS-PSS and DRS-SSS of a specific cell may be transmitted through one of new OFDM symbol locations mentioned in the above section I. Alternatively, the DRS-PSS and the DRS-SSS may be transmitted on a different OFDM symbol location in each cell. The OFDM symbol location on which the DRS-PSS and the DRS-SSS are transmitted may be determined by $N_{ID}^{(1)}$ and/or $N_{ID}^{(2)}$ or a cell ID of a cell for transmitting the DRS-PSS and the DRS-SSS transmitted on the different OFDM symbol location in each cell.

2-2. In Case of Transmitting Only DRS-PSS (or DRS-SSS) on New OFDM Symbol Location A DRS-SSS and a DRS-SSS may be both transmitted as a discovery signal, whereas only the DRS-PSS (or DRS-SSS) may be transmitted on a new OFDM symbol location mentioned in the above section I and the DRS-SSS (or DRS-PSS) may be transmitted on an OFDM symbol location on which the legacy SSS (or legacy PSS) is transmitted.

In this case, the location of the OFDM symbol on which the DRS-SSS (or DRS-PSS) is transmitted may be determined by $N_{ID}^{(1)}$ and/or $N_{ID}^{(2)}$ or a cell ID of a cell for transmitting the DRS-PSS and the DRS-SSS to decrease an influence of interference having an effect on the DRS-SSS (or DRS-PSS) by another cell. That is, for example, although an OFDM symbol location of the DRS-PSS (DRS-SSS) is the same as the location of the legacy PSS (or legacy SSS), the OFDM symbol location of the DRS-SSS (or DRS-PSS) may be determined by $N_{ID}^{(2)}$. In case of an FDD system using a normal CP, an OFDM symbol region for transmitting a DRS-SSS (or DRS-PSS) in a specific cell may be determined for example as follows.

i) Among locations of OFDM symbols capable of transmitting the DRS-SSS (or DRS-PSS), a location of an OFDM symbol for transmitting a DRS-SSS (or DRS-PSS) of a specific cell may be determined randomly. A UE may blindly detect a candidate OFDM symbol location capable of transmitting the DRS-SSS (DRS-PSS).

ii) Among locations of OFDM symbols capable of transmitting the DRS-SSS (or DRS-PSS), a location of an OFDM symbol for transmitting a DRS-SSS (or DRS-PSS) of a specific cell may be determined by $N_{ID}^{(1)}$. For example, the DRS-SSS (or DRS-PSS) may be transmitted on an OFDM symbol #1 in a second slot if a value of $N_{ID}^{(1)}$ mod 3 is 0, an OFDM symbol #2 of the second slot if a value of $N_{ID}^{(1)}$ mod 3 is 1, and an OFDM symbol #3 of the second slot if a value of $N_{ID(1)}$ mod 3 is 2.

Among locations of OFDM symbols capable of transmitting the DRS-SSS (or DRS-PSS), a location of an OFDM symbol for transmitting a DRS-SSS (or DRS-PSS) of a specific cell may be determined by $N_{ID}^{(2)}$. For example, the DRS-SSS (or DRS-PSS) may be transmitted on an OFDM symbol #1 in a second slot if a value of $N_{ID}^{(2)}$ mod 3 is 0, an OFDM symbol #2 of the second slot if a value of $N_{ID}^{(2)}$ mod 3 is 1, and an OFDM symbol #3 of the second slot if a value of $N_{ID}^{(2)}$ mod 3 is 2.

Among the transmission methods described in the above section II, a transmission method applicable to a case where the DRS-PSS and the DRS-SSS are both transmitted is also applicable to a case where multiple DRS-PSSs are transmitted. When two DRS-PSSs are transmitted as a discovery signal and the two DRS-PSSs are respectively a DRS-PSS-1 and a DRS-PSS-2, in the above description, a location at which the DRS-PSS is transmitted may be regarded as a location at which the DRS-PSS-1 is transmitted, and a location at which the DRS-SSS is transmitted may be regarded as a location at which the DRS-PSS-2 is transmitted.

<Small Cell Shared Cell ID Scenario>

A small cell shared cell identification (ID) scenario environment is described to which disclosures of the present specification will be described hereinafter.

The term 'base station' is used hereinafter as an inclusive term including a remote radio head (RRH), an eNB, a transmission point (TP), a reception point (RP), a relay, etc. For convenience of explanation, the proposed method is described hereinafter on the basis of a 3GPP LTE system. However, a range of a system to which the proposed method is applied can be extended to another system other than the 3GPP LTE system.

DRS-PSS, DRS-SSS, DRS-CRS, DRS-CSI-RS, and DRS-PRS may respectively imply PSS, SSS, CRS, CSI-RS, and PRS constituting a discovery signal.

When DRS to be transmitted for a long-term by a specific cell is transmitted in the aforementioned options (a) to (d), a sequence and resource of DRS-PSS and DRS-SSS are configured as similar as possible to legacy PSS and SSS, and a difference with legacy PSS/SSS may lie in that it is transmitted on a different scrambling initial parameter(s) and/or resource location (e.g., different frequency/time resources).

Figure 16:
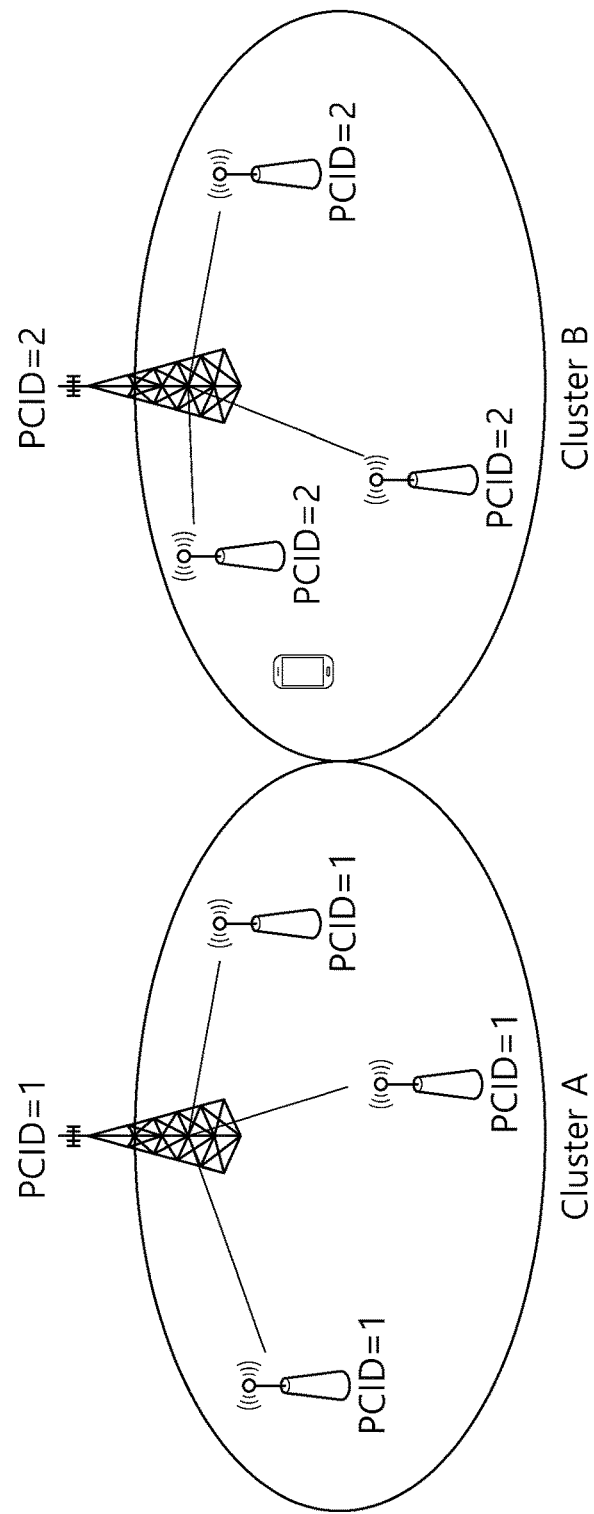
FIG. 16 illustrates an example of a small cell shared cell ID scenario environment in which small cells share a cell ID.

FIG. 16 illustrates an example of a small cell shared cell ID scenario environment.

As shown in FIG. 16, a "small cell shared cell-ID scenario" may imply a scenario in which multiple transmission points (TPs) in a specific (small cell) cluster/group perform transmission with the same physical cell-ID (PCID).

In this case, the PCID may imply a cell-specific ID used for PSS/SSS and CRS transmission similarly to the current LTE technique, or may be a separate cluster ID commonly used in a specific cluster. Unique identification information may be assigned for each TP to obtain a cell-splitting gain among the multiple TPs in the cluster, and this may be named as a TPID.

Representatively, each TPID may be used as a sequence scrambling initialization parameter (e.g., scramblingIdentity) of a reference signal (RS) for one of a discovery signal and CSI-RS transmitted from a corresponding TP, and may also be used for other TP-specific RS transmissions.

A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. The UE may receive DRS-PSS and DRS-SSS to acquire a PCID of each cell (TP). More specifically, the UE may detect the DRS-PSS to acquire $N_{ID}^{(2)}$, and may detect the DRS-SSS to acquire $N_{ID}^{(1)}$.

In the disclosures of the present specification, $N_{ID}^{CSI}$ used to generate a DRS-CSI-RS is called a DRS-CSI-RS scrambling ID. That is, the DRS-CSI-RS scrambling ID may refer to $N_{ID}^{CSI}$ used to generate a CSI-RS sequence in the content of TS 36.211 described below.

The reference-signal sequence $r_{l,n_s}(m)$ is defined by.

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1$$

where $n_s$ is the slot sumber within a radio frame and $l$ is the OFDM symbol number within the slot. The pseudo-random sequence $c(i)$ is defined in Section 7.2. The pseudo-random sequence generator shall be initialised with $$c_{init} = 2^{10} \cdot (7 \cdot (n_s + 1) + l + 1) \cdot (2 \cdot N_{ID}^{CSI} + 1) + 2 \cdot N_{ID}^{CSI} +$$

$N_{CP}$ at the start of each OFDM symbol where $$N_{CP} = \begin{cases} 1 & \text{for normal } CP \\ 0 & \text{for extended } CP \end{cases}.$$

The quantity $N_{ID}^{CSI}$ equals $N_{ID}^{cell}$ unless configured by higher layers That is, the DRS-CSI-RS scrambling ID is a sequence scrambling initialization parameter, and may imply scramblingIdentity-r11 constituting CSI-RSConfigNZP IE (Information Element) in the content of TS 36.331 described below.

| CSI-RS-ConfigNZP information elements |
|---|

```
-- ASN1START

CSI-RS-ConfigZP-r11 ::=         SEQUENCE {
    csi-RS-ConfigNZPId-r11          CSI-RS-ConfigNZPId-r11,
    antennaPortsCount-r11           ENUMERATED (an1, an2, an4, an8),
    resourceConfig-r11              INTEGER (0..31),
    subframeConfig-r11              INTEGER (0..154),
    scramblingIdentity-r11          INTEGER (0..503),
    qcl-CRS-Info-r11                SEQUENCE {
        qcl-ScramblingIdentity-r11      INTEGER (0..503),
        crs-PortsCount-r11              ENUMERATED (n1, n2, n4, spare1),
        mbsfn-SubframeConfigList-r11    CHOICE {
            release                         NULL,
            setup                           SEQUENCE {
                subframaConfigList              MBSFN-SubframeConfigList
```

In the present invention, the DRS-CSI-RS RE config implies a CSI reference signal configuration defined in Table 6.10.5.2-1, 6.10.5.2-2 of TS 36.211. That is, the DRS-CSI-RS RE config may imply resourceConfig-r11 constituting CSI-RSConfigNZP IE in TS 36.331.

In the disclosures of the present specification, it is considered a situation in which each TP transmits a TP-specific discovery RS (DRS). The DRS may consist of several RSs, and it is not assumed that each TP transmits several RSs. For example, if it is assumed that the DRS consists of DRS-PSS/DRS-SSS/DRS-CSI-RS/DRS-CRS, the DRS-PSS/DRS-SSS/DRS-CRS may be transmitted in each TP or may be transmitted in representative TPs. Although it is assumed that the DRS-CSI-RS is included in the DRS transmitted by each TP for convenience of explanation, the present invention is not limited thereto (Other different TP-specific DRSs may be defined and used. For instance, TPs may be detected through DRS-CRS transmission in each TP. For example, a value v-shift for transmitting the CRS may be used by being mapped to a TP scrambling ID.).

In this case, in particular, the DRS-CSI-RS may be transmitted by using a different scrambling sequence initialization parameter and/or RE location for each TP.

The present invention proposes a method of configuring a DRS-CSI-RS, and elements required when a UE detects the DRS-CSI-RS. Although proposed methods are described in the present invention by focusing on transmission of the DRS-CSI-RS, it is apparent that ideas of the present invention are also applicable to an RS element constituting a different discovery signal such as DRS-CRS, DRS-PRS, or the like and to a discovery signal having a different form.

A UE may receive from an eNodeB a DRS measurement timing configuration (i.e., DMTC) which is timing information for a DRS measurement. The DRS measurement timing configuration may include a period and an offset value, and in addition, may also include a duration value.

When the DRS includes a DRS-CSI-RS, a resource and resource configuration (DRS-CSI-RS RE config) in which the DRS-CSI-RS is transmitted may follow the conventional resource and resource configuration in which a CSI-RS can be transmitted, or may be newly defined. When it follows the conventional resource configuration or follows the new resource configuration, a resource configuration table is called a DRS-CSI-RS resource configuration table. The present invention describes a DRS-CSI-RS transmission method based on the configuration table. In addition, although a scrambling identity used in the DRS-CSI-RS may be different from a scrambling identity used in the CSI-RS, a range value thereof may be limited to [0 . . . 503]. The present invention describes a method in which the scrambling identity used in the DRS-CSI-RS is recognized by a terminal, and this will be described by roughly dividing into an implicit mechanism and an explicit mechanism.

In the implicit mechanism, the scrambling identity may be based on a resource configuration table or resource by which a DRS-CSI-RS or information known to the terminal can be transmitted.

In the explicit mechanism, a situation may be assumed in which information is directly given to the terminal through higher layer signaling.

If the scrambling identity is not given in this manner, the terminal must perform blind detection (BD) on [0 . . . 503] scrambling IDs for a corresponding resource, and thus a complexity of the terminal is significantly increased in proportion to the number of DRS-CSI-RS locations. Therefore, it can be said that the present invention aims to limit the number of scrambling IDs to be searched by the terminal in each resource in order to allocate many orthogonal resources while not increasing BD complexity of the terminal.

Hereinafter, disclosures of the present specifications will be described in greater detail with reference to the drawings.

The disclosures of the present specification propose a method of configuring a DRS-CSI-RS when a CSI-RS (e.g., a DRS-CSI-RS) is used for a discovery signal in a small cell shared cell ID scenario environment.

More specifically, a first disclosure among the disclosures of the present specification proposes a method of determining a scrambling ID of a discovery signal through an implicit mechanism, and a second disclosure among the disclosures of the present specification proposes a method of determining the scrambling ID of the discovery signal through an explicit mechanism.

<First Disclosure of the Present Specification—Implicit Mechanism to Determine DRS-CSI-RS Scrambling ID>

As described above, the first disclosure of the present specification proposes a method of determining a scrambling ID of a discovery signal through an implied or implicit mechanism, and a method of detecting the discovery signal by using the determined scrambling ID.

In particular, although the first disclosure of the present specification describes a DRS-CSI-RS for a case where the discovery signal has a form of CSI-RS (or is a CSI-RS based signal), it is apparent to those ordinarily skilled in the art that the first disclosure of the present specification is also applicable to a case where the discovery signal has other forms.

According to the first disclosure of the present specification, there is provided a method for detecting a discovery signal from multiple transmission points (TPs) using the same physical cell identifier (PCID). The method may include: determining a scrambling identifier of the discovery signal for each of the multiple TPs on the basis of the PCID which is commonly used by the multiple TPs and a resource elements (RE) of each of discovery signals transmitted from the respective multiple TPs; demodulating the discovery signal on each position of the RE by using the determined scrambling identifier to detect the discovery signal.

The determining of the scrambling identifier for each of the multiple TPs may be achieved on the basis of the PCID and a resource configuration for the RE of each discovery signal.

In addition, the discovery signal may be a signal based on one or more of a cell-specific reference signal (CRS), a channel-state information reference signal (CSI-RS), a primary synchronization signal (PSS), and a secondary synchronization signal (SSS).

In addition, if the discovery signal may be the signal based on the CSI-RS, the resource configuration for the discovery signal is resourceConfig-r11 which is a CSI reference signal configuration constituting a CSI-RS-ConfigNZP information element (IE).

In addition, the scrambling identifier may be scramblingIdentity-r11 constituting an SI-RS-ConfigNZP IE.

In addition, the scrambling identifier may be determined on the basis of the PCID, a resource configuration for the RE of each discovery signal, and an offset.

Herein, the offset may be configured through higher layer signaling.

In addition, the offset may be configured differently for each PCID.

In addition, the offset may be a value corresponding to a difference between a subframe position at which transmission of the discovery signal starts and a subframe position at which the discovery signal is transmitted.

In addition, the offset may be determined on the basis of a subframe index.

Figure 17:
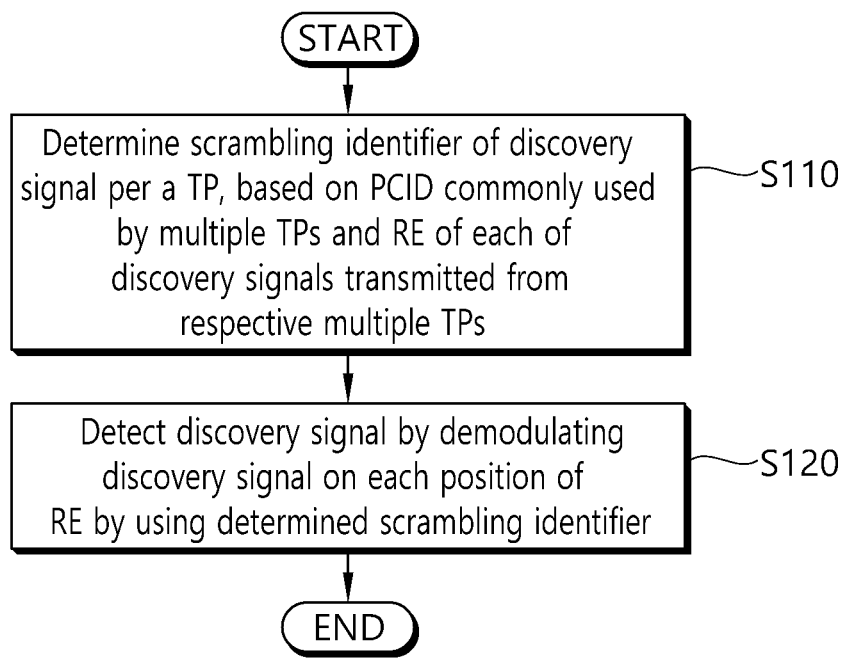
FIG. 17 is a flowchart showing a method of detecting a discovery signal according to a first disclosure of the present specification.

FIG. 17 is a flowchart showing a method of detecting a discovery signal according to a first disclosure of the present specification.

Referring to FIG. 17, a method of detecting a discovery signal according to the first disclosure of the present specification is a method of detecting a discovery signal from multiple transmission points (TPs) using the same physical cell identifier (PCID), and may be achieved in the following steps.

First, a terminal may determine a scrambling identifier of the discovery signal for each of the multiple TPs on the basis of the PCID which is commonly used by the multiple TPs and a resource element (RE) of each of the discovery signals transmitted from the respective multiple TPs (S110).

Next, the terminal may demodulate the discovery signal on each position of the RE by using the determined scrambling identifier to detect the discovery signal (S120).

Hereinafter, a method of determining a scrambling ID will be described in greater detail according to a first disclosure of the present specification.

Determining Method A-1: Determining Based on PCID and DRS-CSI-RS RE Config

The determining method A-1 is a scheme for decreasing a complexity and overhead required when a user equipment (UE) or a terminal detects DRS-CSI-RS and for decreasing a load when an eNodeB has to perform an excessively great amount of configurations to the terminal, and relates to a method of determining a CSI-RS scrambling ID according to a PCID and a DRS-CSI-RS RE config which is a resource element configuration of the DRS-CSI-RS as follows.

A DRS-CSI-RS scrambling ID of DRS-CSI-RS of a specific transmission point (TP) may be determined according to the PCID and the DRS-CSI-RS RE config. That is, the DRS-CSI-RS scrambling ID of the DRS-CSI-RS may differ depending on the PCID and the DRS-CSI-RS RE config.

1. First Example of the Determining Method A-1

According to the first example of the determining method A-1, the DRS-CSI-RS scrambling ID may be equal to '(PCID+DRS-CSI-RS RE config+offset) mod 504'.

In this case, a terminal is not configured separately with the DRS-CSI-RS scrambling ID. Instead, the scrambling ID may be configured according to a physical cell ID detected from the DRS-PSS and the DRS-SSS (or DRS-CRS), a location of a resource element (RE) in which the DRS-CSI-RS is transmitted, or a DRS-CSI-RS RE config.

In other words, in case of a DRS-CSI-RS having a scrambling ID=x, for example, if a resource configuration table of the DRS-CSI-RS has 20 entries in total, a configuration of an RE in which the DRS-CSI-RS can be transmitted may correspond to a "(x+PCID+offset1) mod 20"-th resource in the resource configuration table.

In particular, in case of using a normal cyclic prefix (CP), when the DRS-CSI-RS is transmitted in the same subframe as the DRS-PSS and the DRS-SSS and when the DRS-PSS and the DRS-SSS are transmitted through the same RE location as the legacy PSS and the legacy SSS, the DRS-CSI-RS cannot be transmitted in OFDM symbols #5 and #6 of a first slot in which the DRS-PSS and the DRS-SSS can be transmitted.

Therefore, the DRS-CSI-RS RE config of the DRS-CSI-RS may be limited only to the remaining DRS-CSI-RS RE configs other than the DRS-CSI-RE config transmitted through the OFDM symbols #5 and #6 of the first slot (e.g., CSI-RS reference signal configurations 0, 5, 10, and 11).

In this case, an offset value may be as follows.

It may be a value configured by the eNodeB to the terminal through higher layer signaling. In particular, the offset value may be a value configured to the terminal for each PCID (or for each frequency or for each PCID list). That is, the offset value may be different for each PCID.

Alternatively, offset=$N_{ID}^{(2)}$ or offset=$N_{ID}^{(1)}$.

Alternatively, the offset value may be a value configured differently for each PCID according to a specific equation. That is, the offset value may be expressed by f(PCID) (e.g., a function of PCID).

Alternatively, the offset value may always be equal to 0.

Alternatively, the offset value may be a value corresponding to an offset from a subframe position at which DRS transmission starts (or a start subframe position of a DMTC duration) to a subframe position at which DRS-CSI-RS is transmitted.

Alternatively, the offset value may be equal to a subframe index, or may be a value determined by the subframe index.

Herein, the aforementioned eNodeB may be an eNodeB for managing/controlling a primary cell (PCell) of the terminal, an eNodeB for managing/controlling a serving cell of the terminal, or an eNodeB for transmitting assistant information to the terminal.

In addition, the first disclosure of the present specification may be applied only in a shared cell-ID scenario. In a non-shared cell-ID scenario, the DRS-CSI-RS scrambling ID may be equal to a PCID.

In addition, in the shared cell-ID scenario, the DRS-CSI-RS scrambling ID may be equal to (PCID+DRS-CSI-RS RE config+offset) mod 504, whereas in the non-shared cell-ID scenario, the offset value may be equal to −1*CSI-RS RE config.

2. Second Example of Determining Method A-1

According to the second example of the determining method A-1, the DRS-CSI-RS scrambling ID may be equal to ([504/N]×DRS-CSI-RS RE config+PCID+offset) mod 504'. In this case, N is the total number of DRS-CSI-RS RE configs.

In this case, the terminal is not configured separately with the DRS-CSI-RS scrambling ID. Instead, the scrambling ID may be configured according to a physical cell ID detected from the DRS-PSS and the DRS-SSS (or DRS-CRS), a location of a resource element (RE) in which the DRS-CSI-RS is transmitted, or a DRS-CSI-RS RE config.

In this case, an offset value may be as follows.

It may be a value configured by the eNodeB to the terminal through higher layer signaling. In particular, the offset value may be a value configured to the terminal for each PCID (or for each frequency or for each PCID list). That is, the offset value may be different for each PCID.

Alternatively, offset=$N_{ID}^{(2)}$ or offset=$N_{ID}^{(1)}$.

Alternatively, the offset value may be a value configured differently for each PCID according to a specific equation. That is, the offset value may be expressed by f(PCID) (e.g., a function of PCID).

Alternatively, the offset value may always be equal to 0.

Alternatively, the offset value may be a value corresponding to an offset from a subframe position at which DRS transmission starts (or a start subframe position of a DMTC duration) to a subframe position at which DRS-CSI-RS is transmitted.

Alternatively, the offset value may be equal to a subframe index, or may be a value determined by the subframe index.

Herein, the aforementioned eNodeB may be an eNodeB for managing/controlling a PCell of the terminal, an eNodeB for managing/controlling a serving cell of the terminal, or an eNodeB for transmitting assistant information to the terminal.

Determining Method A-2: Determining Based on PCID

As another method capable of decreasing a range of a DRS-CSI-RS scrambling ID to be searched by a terminal, there may be a method in which the range of the DRS-CSI-RS scrambling ID to be searched by the terminal is configured according to a PCID (or $N_{ID}^{(1)}$ and/or $N_{ID}^{(2)}$).

For example, a range of an available DRS-CSI-RS scrambling ID may be pre-defined in a form of a table or an equation according to a PCID value of a specific TP (or cell).

In addition, the range of the available DRS-CSI-RS scrambling ID in the specific TP may be equal to {(504/M)×(PCID mod M), (504/M)×(PCID mod M)+1, (504/M)×(PCID mod M)+2, . . . , (504/M)×(PCID mod M)+M−1}.

In this case, the terminal is not configured separately with the DRS-CSI-RS scrambling ID. Instead, the scrambling ID may be configured according to a physical cell ID detected from the DRS-PSS and the DRS-SSS (or DRS-CRS).

In this case, a value M may be the number of DRS-CRI-RS RE configs. For example, when a normal CP is used, it may be configured to 20 in case of FDD, and may be configured to 32 in case of TDD. When an extended CP is used, it may be configured to 16 in case of FDD, and may be configured to 28 in case of TDD. Alternatively, the value M may always be configured to 32 irrespective of the normal/extended CP and the FDD/TDD.

The determining method A-2 may be applied only in the shared cell-ID scenario. In a non-shared cell-ID scenario, the DRS-CSI-RS scrambling ID may be equal to the PCID.

A-3. Determining Based on PCID, DRS-CSI-RS RE Config, and Subframe Index

A scrambling ID of a DRS-CS-RS transmitted in a specific TP may be determined according to a PCID and/or a DRS-CSI-RS RE config and a timing index (e.g., a subframe index).

That is, the DRS-CSI-RS scrambling ID may be expressed by a function of the PCID and/or the DRS-CSI-RS RE config and the timing index (e.g., DRS-CSI-RS scrambling ID=f(PCID, DRS-CSI-RS RE config, timing index) or DRS-CSI-RS scrambling ID=f(PCID, timing index), or DRS-CSI-RS scrambling ID=f(DRS-CSI-RS RE config, timing index)).

Therefore, even in case of the DRS-CSI-RS in which the same TP is transmitted through the same RE, a scrambling ID of the DRS-CSI-RS may vary depending on a timing at which the DRS-CSI-RS is transmitted.

In particular, a timing index may be as follows.

A timing index of a cell for transmitting a discovery signal (e.g., a subframe index, SFN)

A timing index of a primary cell (PCell), serving cell, and secondary cell group (SCG) secondary PCell (sPCell) of the terminal (e.g., a subframe index, SFN).

A timing index of a cell for transmitting assistance information and a discovery signal configuration to the terminal (e.g., a subframe index, SFN).

<Second Disclosure of the Present Specification—Explicit Mechanism to Determine DRS-CSI-RS Scrambling ID>

As described above, the second disclosure of the present specification proposes a method of determining a scrambling ID of a discovery signal through an explicit mechanism.

Determining Method B-1: Determining Based on PCID and DRS-CSI-RS RE Config

According to the determining method B-1, a DRS-CSI-RS scrambling ID of a DRS-CSI-RS of a specific TP may be determined according to a PCID (or $N_{ID}^{(1)}$ and/or $N_{ID}^{(2)}$) and a DRS-CSI-RS RE config.

That is, the DRS-CSI-RS scrambling ID of the DRS-CSI-RS based on the PCID and the DRS-CSI-RS RE config may be configured by an eNodeB to a terminal through higher layer signaling.

For example, the eNodeB may report a DRS-CSI-RS scrambling ID (x,y) which is a DRS-CSI-RS scrambling ID when PCID=x and DRS-CSI-RS RE config=y to the terminal through the higher layer signaling with respect to all possible values x (e.g., 0~503) and all possible values y (e.g., 0~19).

Alternatively, if the terminal reports to the eNodeB the PCID (or $N_{ID}^{(1)}$ and/or $N_{ID}^{(2)}$) detected or discovered by the terminal, the eNodeB may report a CSI-RS scrambling ID, which can be used by the terminal to detect the DRS-CSI-RS, for each DRS-CSI-RS RE config by using the PCID reported by the terminal.

For example, if the terminal reports to the eNodeB the PCID=X detected by the terminal, by using this, the eNodeB may report a DRS-CSI-RS scrambling ID (y), which is a DRS-CSI-RS scrambling ID when DRS-CSI-RS RE config=y, with respect to all possible values y (e.g., 0~19).

The DRS-CSI-RS scrambling ID may be expressed, for example, by a list of M values such that a y-th value thereof implies a DRS-CSI-RS scrambling ID in an orderly manner when a CSI-RS scrambling ID is y−1.

In this case, the value M may be the number of DRS-CSI-RS RE configs. For example, when a normal CP is used, the value may be configured to 20 in case of FDD, and may be configured to 32 in case of TDD. When an extended CP is used, the value may be configured to 16 in case of FDD, and may be configured to 28 in case of TDD. Alternatively, the value M may also be configured to 32 irrespective of the normal/extended CP and the FDD/TDD.

In addition, the aforementioned eNodeB may be an eNodeB for managing/controlling a PCell of the terminal, an eNodeB for managing/controlling a serving cell of the terminal, or an eNodeB for transmitting assistant information to the terminal.

Determining Method B-2: Determining Based on PCID

According to the determining method B-2, a DRS-CSI-RS scrambling ID may be determined according to a PCID (or $N_{ID}^{(1)}$ and/or $N_{ID}^{(2)}$).

For example, an available DRS-CSI-RS scrambling ID may be configured to a terminal from a higher layer according to a PCID value of a specific TP (cell).

That is, a range of the available DRS-CSI-RS scrambling ID in the CRS-CSI-RS transmitted by the specific TP may vary depending on $N_{ID}^{(1)}$ and/or $N_{ID}^{(2)}$.

In this case, the DRS-CSI-RS scrambling ID range/list based on $N_{ID}^{(1)}$ and/or $N_{ID}^{(2)}$ may be configured by the eNodeB to the terminal. For example, the eNodeB may report N DRS-CSI-RS scrambling IDs, which can be used when PCID=x, to the terminal through higher layer signaling with respect to all available values x (e.g., 0~503).

Accordingly, the terminal may know N DRS-CSI-RS scrambling IDs corresponding to the PCID detected by the terminal, and may attempt detection of the DRS-CSI-RS on the basis of the DRS-CSI-RS scrambling IDs.

Alternatively, when the terminal reports the PCID (or $N_{ID}^{(1)}$ and/or $N_{ID}^{(2)}$) to the eNodeB, the eNodeB may configure the range/list of the DRS-CSI-RS scrambling ID that can be used by the terminal to detect the DRS-CSI-RS by using $N_{ID}^{(1)}$ and/or $N_{ID}^{(2)}$ reported by the terminal.

For example, if the terminal reports the PCID=X detected by the terminal to the eNodeB, by using this, the eNodeB may report N DRS-CSI-RS scrambling IDs to the terminal. In this case, the DRS-CSI-RS scrambling IDs may be expressed, for example, by a list of N values.

In addition, the aforementioned eNodeB may be an eNodeB for managing/controlling a PCell of the terminal, an eNodeB for managing/controlling a serving cell of the terminal, or an eNodeB for transmitting assistant information to the terminal.

Hereinafter, an additional disclosure of the present specification will be described.

<Additional Disclosure of the Present Specification—Configuration on Shared Cell ID or Non-Shared Cell ID Operation>

In order for a terminal to determine how a DRS-CSI-RS scrambling ID is configured when a DRS-CSI-RS is detected, there is a need to know whether a corresponding TP belongs to a shared cell-ID scenario environment or belongs to a non-shared cell-ID scenario environment.

Therefore, the additional disclosure of the present specification provides a method of configuring and determining the shared cell-ID scenario or the non-shared cell-ID scenario.

1. First Method: Indication of Shared Cell-ID Scenario/Non-Shared Cell-ID Scenario The first method suggests that whether a shared cell-ID scenario is used or a non-shared cell-ID scenario is used at a corresponding frequency is configured to a terminal through higher layer signaling for each frequency.

In addition, the first method suggests to report whether a corresponding measurement object uses a shared cell-ID scenario or a non-shared cell-ID scenario for each measurement object defined in TS 36.331.

For this, information regarding whether a corresponding measurement object uses the shared cell-ID scenario or the non-shared cell-ID scenario may be included in MeasObjectEUTRA described below.

MeasObjectEUTRA information element

```
-- ASN1START

MeasObjectEUTRA ::=        SEQUENCE {
    carrierFreq                ARFCN-ValueEUTRA,
    allowedMeasBandwidth       AllowedMeasBandwidth,
    presenceAntennaPort1       PresenceAntennaPort1,
    neighCellConfig            NeighCellConfig,
    offsetFreq                 Q-OffsetRange                DEFAULT dB0,
    -- Cell list
    cellsToRemoveList          CellIndexList                OPTIONAL,    -- Need ON
    cellsToAddModList          CellsToAddModList            OPTIONAL,    -- Need ON
    -- Black list
    blackCellsToRemoveList     CellIndexList                OPTIONAL,    -- Need ON
    blackCellsToAddModList     BlackCellsToAddModList       OPTIONAL,    -- Need ON
    cellForWhichToReportCGI    PhysCellId                   OPTIONAL,    -- Need ON
    ...,
    [[ measCycleSCell-r10      MeasCycleSCell-r10           OPTIONAL,    -- Need ON
       measSubframePatternConfigNeigh-r10    MeasSubframePatternConfigNeigh-r10    OPTIONAL
    ]]
    [[ widebandRSRQ-Meas-r11   BOOLEAN OPTIONAL    -- Cond WB-RSRQ
    ]]
}
```

2. Second Method: Indication of RSRP/RSRQ Measurement RS

The second method suggests that, in order for a terminal to determine how to configure a DRS-CSI-RS scrambling ID, an eNodeB indicates a reference signal (RS) to the terminal to perform RSRP/RSRQ measurement through higher layer signaling.

In particular, the second method suggests that the eNodeB reports whether the RSRP/RSRQ measurement will be performed using a DRS-CRS (or CRS) or using a DRS-CSI-RS (or CSI-RS) to the terminal through the higher layer signaling.

Accordingly, the terminal may determine whether an operation to be performed is based on a non-shared cell-ID operation or a shared cell-ID operation.

In addition, in the following case, the terminal may interpret this as that the operation to be performed is based on the non-shared cell-ID operation.

When the eNodeB provides an indication to the terminal to perform RSRP/RSRQ measurement using DRS-CRS (or CRS) through higher layer signaling.
When the eNodeB does not provide an indication to the terminal to perform RSRP/RSRQ measurement using DRS-CSI-RS (or CSI-RS) through higher layer signaling.
When the eNodeB provides an indication to the terminal not to perform RSRP/RSRQ measurement using DRS-CSI-RS (or CSI-RS) through higher layer signaling.

In this case, the terminal may assume that the DRS-CSI-RS scrambling ID is equal to a PCID.

Meanwhile, in the following case, the terminal may interpret this as that the operation to be performed is based on the non-shared cell-ID operation.

When the eNodeB provides an indication to the terminal not to perform RSRP/RSRQ measurement using DRS-CSI-RS (or CSI-RS) through higher layer signaling.
When the eNodeB does not provide an indication to the terminal to perform RSRP/RSRQ measurement using DRS-CSI-RS (or CSI-RS) through higher layer signaling.
When the eNodeB provides an indication to the terminal to perform RSRP/RSRQ measurement using DRS-CRS (or CRS) through higher layer signaling.

In this case, the terminal may assume that the DRS-CSI-RS scrambling ID is determined through the implied or implicit mechanism mentioned above in the first and second disclosures of the present specification.

In addition, in this case, the terminal may assume that the DRS-CSI-RS scrambling ID is equal to (PCID+DRS-CSI-RS RE config+offset) mod 504.

An indication which plays a role of reporting whether the DRS-CRS (or CRS) will be used or the DRS-CSI-RS (or CSI-RS) will be used to perform the aforementioned RSRP/RSRQ measurement may be configured for each frequency through a higher layer.

Alternatively, it may be configured for each measurement object defined in TS 36.331. For this, in a corresponding measurement object, the indication which plays a role of reporting whether the DRS-CRS (or CRS) will be used or the DRS-CSI-RS (or CSI-RS) will be used to perform the RSRP/RSRQ measurement may be included in MeasObjectEUTRA.

The aforementioned method may be applied when the DRS is configurable with the PSS/SSS/CSI-RS/CRS or the PSS/SSS/CRS or when the DRS is configurable with the PSS/SSS/CSI-RS/CRS or the PSS/SSS/CSI-RS.

Third Method: Indication of DRS-CSI-RS Scrambling ID(Function)

The third method suggests that, in order for a terminal to determine how to configure a DRS-CSI-RS scrambling ID, an eNodeB reports to a terminal through higher layer signaling whether the DRS-CSI-RS scrambling ID is: a) equal to a PCID; or b) determined through an implicit or explicit configuration mechanism based on the aforementioned first and second disclosures of the present specification In this case, when it is said that the eNodeB reports to the terminal through higher layer signaling that the DRS-CSI-RS scrambling ID is determined through the implicit or explicit configuration mechanism based on the aforementioned first and second disclosures of the present specification, it may mean that the eNodeB reports, for example, that the DRS-CSI-RS scrambling ID is equal to (PCID+DRS-CSI-RS RE config+offset) mod 504.

An indication reporting whether the aforementioned DRS-CSI-RS scrambling ID is: a) equal to the PCID; or b) determined through the implicit or explicit mechanism based on the first and second disclosures of the aforementioned present specification may be configured for each frequency through a higher layer.

Alternatively, it may be configured for each measurement object defined in TS 36.331. For this, in a corresponding measurement object, an indication indicating whether the DRS-CSI-RS scrambling ID is: a) equal to the PCID; or b) determined through the implicit or explicit mechanism based on the first and second disclosures of the aforementioned present specification may be included in MeasObjectEUTRA.

Fourth Method: Indication of 'Offset' Value in DRS-CSI-RS Scrambling ID Function The fourth method suggests that, when a DRS-CSI-RS scrambling ID is equal to (PCID+DRS-CSI-RS RE config+offset) mod 504, an eNodeB reports to a terminal through higher layer signaling whether an offset value is: a) equal to −1*CSI-RS RE config; or b) uses a value configured through higher layer signaling mentioned in the first disclosure of the present specification (or offset=$N_{ID}^{(2)}$ (or $N_{ID}^{(1)}$)).

If the eNodeB reports to the terminal that the offset value is equal to −1*CSI-RS RE config, the terminal may determine that the offset value of the DRS-CSI-RS scrambling ID is equal to −1*CSI-RS RE config (i.e., the DRS-CSI-RS scrambling ID is equal to the PCID), and thus may interpret this as that an operation to be performed is based on a non-shared cell-ID operation.

Meanwhile, if it is reported that the offset value is equal to the case b), the terminal may acquire the DRS-CSI-RS scrambling ID based on the PCID and the DRS-CSI-RS RE config by using the offset value configured from the higher layer, and may interpret this as that the operation to be performed is based on a shared cell-ID operation.

The aforementioned configuration/indication may be configured for each frequency through a higher layer. Alternatively, the indication may be configured for each cell ID or for each cell ID list through the higher layer. In addition, the indication may be configured for each measurement object defined in TS 36.331.

The aforementioned embodiments of the present invention can be implemented through various means. For example, the embodiments of the present invention can be implemented in hardware, firmware, software, combination of them, etc. Details thereof will be described with reference to the drawing.

Figure 18:
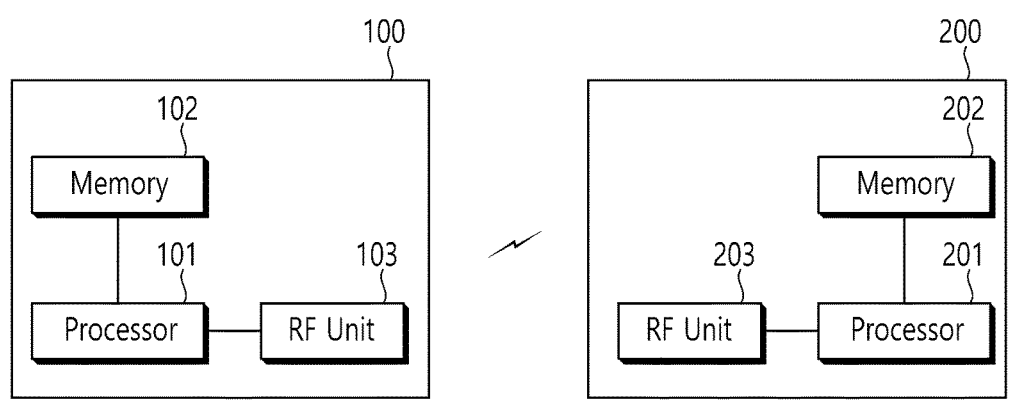
FIG. 18 is a block diagram of a wireless communication system according to an embodiment of the present invention.

FIG. 18 is a block diagram of a wireless communication system according to an embodiment of the present invention.

An eNodeB 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the eNodeB may be implemented by the processor 201.

An MTC device 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

According to a disclosure of the present specification, there is provided a terminal for detecting a discovery signal from multiple transmission points (TPs) using the same physical cell identifier (PCID). The terminal may include: a radio frequency (RF) unit; and a processor for determining a scrambling identifier of the discovery signal for each of the multiple TPs on the basis of the PCID which is commonly used by the multiple TPs and a resource elements (RE) of each of discovery signals transmitted from the respective multiple TPs, and for demodulating the discovery signal on each position of the RE by using the determined scrambling identifier to detect the discovery signal.

Herein, the determining of the scrambling identifier for each of the multiple TPs may be achieved on the basis of the PCID and a resource configuration for the RE of each discovery signal.

In addition, the discovery signal may be a signal based on one or more of a cell-specific reference signal (CRS), a channel-state information reference signal (CSI-RS), a primary synchronization signal (PSS), and a secondary synchronization signal (SSS).

In addition, if the discovery signal is the signal based on the CSI-RS, the resource configuration for the discovery signal may be resourceConfig-r11 which is a CSI reference signal configuration constituting a CSI-RS-ConfigNZP information element (IE).

In addition, the scrambling identifier may be scramblingIdentity-r11 constituting an SI-RS-ConfigNZP IE.

In addition, the scrambling identifier may be determined on the basis of the PCID, a resource configuration for the RE of each discovery signal, and an offset.

According to a disclosure of the present specification, the aforementioned conventional technical problem is solved. More specifically, according to the disclosure of the present specification, there is an advantage in that a scrambling identifier (ID) for a discovery signal is effectively determined, thereby decreasing an additional complexity and overhead required to detect the discovery signal.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving a discovery signal from each of multiple transmission points (TPs) in a wireless communication system, the method performed by a user equipment (UE) and comprising:
   determining whether the multiple TPs have a same physical cell identifier (PCID);
   applying a scrambling identifier for each of the multiple TPs when the multiple TPs have the same PCID; and
   detecting the discovery signal on a resource element based on the scrambling identifier,
   wherein the scrambling identifier is implicitly indicated by the same PCID and a configuration for the resource element, and
   wherein if the UE is instructed not to perform measurement using the discovery signal, the UE determines that the multiple TPs have the same PCID, and if the UE is instructed to perform measurement using the discovery signal, the UE determines that the multiple TPs have different PCIDs.

2. The method of claim 1, wherein the discovery signal is a signal based on one or more of a cell-specific reference signal (CRS), a channel-state information reference signal (CSI-RS), a primary synchronization signal (PSS), and a secondary synchronization signal (SSS).

3. The method of claim 2, wherein if the discovery signal is the signal based on the CSI-RS, the configuration is resourceConfig-r11 which is a CSI reference signal configuration constituting a CSI-RS-ConfigNZP information element (IE).

4. The method of claim 1, wherein the scrambling identifier is scramblingIdentity-r11 constituting an SI-RS-ConfigNZP IE.

5. A user equipment (UE) for receiving a discovery signal from each of multiple transmission points (TPs) in a wireless communication system, the UE comprising: a radio frequency (RF) unit that transmits and receives a wireless signal; and
   a processor operating in functional combination with the RF unit,
   wherein the processor:
      determines whether the multiple TPs have a same physical cell identifier (PCID),
      applies a scrambling identifier for each of the multiple TPs when the multiple TPs have the same PCID, and
      detects the discovery signal on a resource element based on the determined scrambling identifier,
   wherein the scrambling identifier is implicitly indicated by the same PCID and a configuration for the resource element, and
   wherein if the UE is instructed not to perform measurement using the discovery signal, the processor determines that the multiple TPs have the same PCID, and if the UE is instructed to perform measurement using the discovery signal, the processor determines that the multiple TPs have different PCIDs.

6. The UE of claim 5, wherein the discovery signal is a signal based on one or more of a cell-specific reference signal (CRS), a channel-state information reference signal (CSI-RS), a primary synchronization signal (PSS), and a secondary synchronization signal (SSS).

7. The UE of claim 6, wherein if the discovery signal is the signal based on the CSI-RS, the configuration is resourceConfig-r11 which is a CSI reference signal configuration constituting a CSI-RS-ConfigNZP information element (IE).

8. The UE of claim 5, wherein the scrambling identifier is scramblingIdentity-r11 constituting an SI-RS-ConfigNZP IE.

* * * * *